(12) United States Patent
Stanley et al.

(10) Patent No.: US 11,911,751 B2
(45) Date of Patent: Feb. 27, 2024

(54) CATALYST COMPOSITIONS FOR HYDROFORMYLATION AND METHODS OF USE THEREOF

(71) Applicant: Board of Supervisors of Louisiana State University and Agricultural and Mechanical College, Baton Rouge, LA (US)

(72) Inventors: George Geoffrey Stanley, Baton Rouge, LA (US); Drew Michael Hood, Baton Rouge, LA (US)

(73) Assignee: Board of Supervisors of Louisiana State University and Agricultural and Mechanical College, Baton Rouge, LA (US)

( * ) Notice: Subject to any disclaimer, the term of this patent is extended or adjusted under 35 U.S.C. 154(b) by 0 days.

(21) Appl. No.: 18/089,365

(22) Filed: Dec. 27, 2022

(65) Prior Publication Data

US 2023/0142139 A1 May 11, 2023

Related U.S. Application Data

(63) Continuation of application No. 15/733,905, filed as application No. PCT/US2019/036194 on Jun. 8, 2019.

(60) Provisional application No. 62/682,192, filed on Jun. 8, 2018.

(51) Int. Cl.
*B01J 31/24* (2006.01)

(52) U.S. Cl.
CPC ...... *B01J 31/2409* (2013.01); *B01J 2231/321* (2013.01); *B01J 2531/0216* (2013.01); *B01J 2531/845* (2013.01)

(58) Field of Classification Search
None
See application file for complete search history.

(56) References Cited

PUBLICATIONS

Yamamoto et al. (Journal of Organometallic Chemistry, 1976, 116, 231-237). (Year: 1976).*
Huo et al. (Organometallics, 2005, 24(24), 6037-6042 (Year: 2005).*

* cited by examiner

*Primary Examiner* — Yun Qian
(74) *Attorney, Agent, or Firm* — Thomas| Horstemeyer LLP.

(57) ABSTRACT

Disclosed are highly active cationic cobalt phosphine complexes, both mono- and bimetallic, that can catalyze hydroformylation reactions. The disclosed catalysts can be utilized in methods that provide reaction processes that are hundreds of times faster than high pressure $HCo(CO)_4$ or phosphine-modified $HCo(CO)_3(PR_3)$ catalysts and operate at considerably lower pressures and temperatures. Also disclosed are methods of hydroformylation using the described transition metal complexes. This abstract is intended as a scanning tool for purposes of searching in the particular art and is not intended to be limiting of the present disclosure.

4 Claims, 6 Drawing Sheets

CATALYST COMPOSITIONS FOR HYDROFORMYLATION AND METHODS OF USE THEREOF

CROSS-REFERENCE TO RELATED APPLICATIONS

This application is a continuation of U.S. patent application Ser. No. 15/733,905, having the title "CATALYST COMPOSITIONS FOR HYDROFORMYLATION AND METHODS OF USE THEREOF", filed on Dec. 1, 2020, which is the 35 U.S.C. § 371 National Stage application of International Application No. PCT/US2019/036194, having the title "CATALYST COMPOSITIONS FOR HYDROFORMYLATION AND METHODS OF USE THEREOF", filed on Jun. 8, 2019, which application claims the benefit of and priority to U.S. Provisional Application No. 62/682,192, filed on Jun. 8, 2018, the contents of which are each incorporated by reference in their entirety.

STATEMENT REGARDING FEDERALLY SPONSORED RESEARCH OR DEVELOPMENT

This invention was made with Government support under contract CHE0111117 awarded by the National Science Foundation. The government has certain rights in the invention.

BACKGROUND OF THE DISCLOSURE

Hydroformylation is a reaction that converts alkenes, CO, and $H_2$ into aldehyde products with linear and branched regioselectivities. Side reactions include alkene isomerization and hydrogenation. ExxonMobil has a hydroformylation plant in Baton Rouge that uses the well-known $HCo(CO)_4$ catalyst system, which was originally discovered by Otto Roelen in Germany in 1938. $HCo(CO)_4$ is considered the most active cobalt catalyst system known, but has a major weakness in that it decomposes to inactive cobalt metal unless high enough pressures of CO gas are used. As the temperature of the reaction increases, the CO partial pressure used must increase logarithmically in order to keep $HCo(CO)_4$ from decomposing to cobalt metal. ExxonMobil runs their hydroformylation process using a mixture of branched internal alkenes ($C_6$ to $C_{12}$) around 180° C. and 250-300 bar of $H_2/CO$. Under these conditions, aldehydes can be produced with about a 2:1 linear to branched (L:B) selectivity. This is often called the high-pressure or unmodified cobalt technology. Because the $HCo(CO)_4$ catalyst has low hydrogenation activity, the aldehydes are hydrogenated to alcohols in a subsequent catalytic step.

Shell Chemical discovered that the addition of an alkylated phosphine ligand to the cobalt catalyst system generated a less active but far more regioselective catalyst for producing linear aldehydes. The phosphine ligand keeps the cobalt catalyst, $HCo(CO)_3(PR_3)$, from decomposing as easily to cobalt metal. This allows Shell to run their hydroformylation plant under milder pressures and temperatures: 180-200° C. and 60-70 bar. The phosphine ligand increased the aldehyde L:B selectivity to 8:1, which is very desirable for Shell's market. The phosphine ligand also increases the activity of the cobalt catalyst fairly dramatically for hydrogenating the aldehyde to alcohol, which is also Shell's desired product. One moderately serious problem with the Shell catalyst is that it also hydrogenates alkene into alkane, consuming about 15-20% of the valuable alkene starting material to semi-worthless alkane.

Despite advances in research directed to catalysts and methods for hydroformylation, there remain a need for improved, efficient, and accessible catalysts and methods for this reaction. These needs and other needs are satisfied by the present disclosure.

SUMMARY

In accordance with the purpose(s) of the disclosure, as embodied and broadly described herein, the disclosure, in one aspect, relates to compositions comprising cationic transition metal phosphine complexes, both mono- and bimetallic, e.g., a cobalt phosphine complex, that can be used to catalyze hydroformylation reactions, and methods of making same. The disclosed catalysts can be utilized in methods that provide reaction processes that are hundreds of times faster than high pressure $HCo(CO)_4$ or phosphine-modified $HCo(CO)_3(PR_3)$ catalysts and operate at considerably lower pressures and temperatures.

Disclosed are compounds of formula I, or a salt, solvate, or stereoisomer thereof:

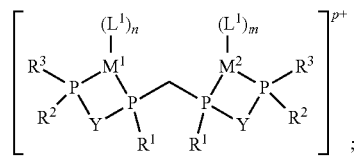

formula I wherein in formula I: X is selected from the group consisting of O, $NR^8$, and $CR^9R^{10}$, wherein $R^8$, $R^9$, and $R^{10}$ can be the same or different and are each independently selected from the group consisting of H, $C_1$-$C_5$ alkyl, $C_2$-$C_5$ alkenyl, $C_1$-$C_5$ alkoxy, $C_1$-$C_{20}$ alcohol, $C_3$-$C_6$ cycloalkyl, $C_3$-$C_6$ cycloalkoxy, $C_6$-$C_{10}$ aryl, $C_6$-$C_{10}$ alkaryl, $C_6$-$C_{10}$ aralkyl, $C_4$-$C_{10}$ heteroaryl, and combinations thereof; or optionally $R^9$ and $R^{10}$ can together form a $C_3$-$C_6$ cycloalkyl ring; each occurrence of Y independently represents a divalent linking group selected from the group consisting of $C_1$-$C_6$ alkyl, $C_1$-$C_6$ alkenyl, $C_6$-$C_{14}$ aryl, $C_4$-$C_{14}$ heteroaryl, O, $NR^4$, and combinations thereof; each occurrence of $R^1$, $R^2$, $R^3$, and $R^4$ is independently selected from the group consisting of $C_1$-$C_{20}$ alkyl, $C_1$-$C_8$ alkoxy, $C_1$-$C_{20}$ alcohol, $C_3$-$C_6$ cycloalkyl, $C_3$-$C_6$ cycloalkoxy, $C_6$-$C_{10}$ aryl, $C_6$-$C_{10}$ alkaryl, $C_6$-$C_{10}$ aralkyl, $C_4$-$C_{10}$ heteroaryl, and combinations thereof; or $R^2$ and $R^3$ may optionally be joined together to form a ring; or optionally one of $R^1$ and one of either $R^9$ or $R^{10}$ may together form a ring; $M^1$ and $M^2$ each independently represent a transition metal selected from the group consisting of Fe, Co, Ni, Cu, Ru, Rh, Pd, Ir, and Pt, and $M^1$ and $M^2$ can be the same or different; n is an integer between 0 and 4, wherein the value of the number n for the ligand $L^1$ depends on the transition metal $M^1$ and is selected such that the transition metal $M^1$ has 14, 15, 16, 17, 18, or 19 valence electrons; m is an integer between 0 and 4, wherein the value of the number m for the ligand $L^2$ depends on the transition metal $M^2$ and is selected such that the transition metal $M^2$ has 14, 15, 16, 17, 18, or 19 valence electrons; p is an integer between 0 and 4; and L and $L^2$ can be the same or different and each occurrence is independently selected from the group consisting of trialkylphosphine, tricycloalkylphosphine, diethyl ether, tetrahydrofuran, $H_2O$, CO, acetylacetonate, acetate, $C_1$-$C_6$ alkoxide, acetonitrile, cyclooctadiene, $N(R^{11})_3$, $N(R^{11})_2$, $C_1$-$C_6$ alkyl, $C_4$-$C_{10}$ heteroaryl, $C_4$-$C_{10}$ heterocycle, H, Cl, Br, I, and F; wherein $R^{11}$ is H, alkyl, cycicoalkyl, heteroalkyl, or heterocyclic.

Also disclosed are compounds of formula (II), or a salt, solvate, or stereoisomer thereof:

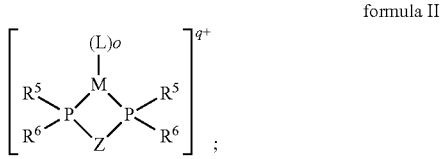

formula II wherein in formula (II): each occurrence of $R^5$ and $R^6$ is independently selected from the group consisting of $C_1$-$C_{20}$ alkyl, $C_1$-$C_8$ alkoxy, $C_1$-$C_{20}$ alcohol, $C_3$-$C_6$ cycloalkyl, $C_3$-$C_6$ cycloalkoxy, $C_6$-$C_{10}$ aryl, $C_6$-$C_{10}$ alkaryl, $C_6$-$C_{10}$ aralkyl, or combinations thereof; or $R^5$ and $R^6$ may optionally be joined together to form a ring; Z represents a divalent linking group selected from the group consisting of $C_1$-$C_6$ alkyl, $C_1$-$C_6$ alkenyl, $C_6$-$C_{14}$ aryl, $C_4$-$C_{14}$ heteroaryl, O, $NR^4$, and combinations thereof; M is a transition metal selected from the group consisting of Fe, Co, Ni, Cu, Ru, Rh, Pd, Ir, and Pt; o is an integer between 0 and 4, wherein the value of the number o for the ligand L depends on the transition metal M and is selected such that the transition metal M has 14, 15, 16, 17, 18, or 19 valence electrons; q is an integer between 0 and 4; and each occurrence of L can be the same or different and is selected from the group consisting of trialkylphosphine, tricycloalkylphosphine, diethyl ether, tetrahydrofuran, $H_2O$, CO, acetylacetonate, acetate, $C_1$-$C_6$ alkoxide, acetonitrile, cyclooctadiene, $N(R^{11})_3$, $N(R^{11})_2$, $C_1$-$C_6$ alkyl, $C_4$-$C_{10}$ heteroaryl, $C_4$-$C_{10}$ heterocycle, H, Cl, Br, I, and F; wherein $R^{11}$ is H, alkyl, cycicoalkyl, heteroalkyl, or heterocyclic.

Also disclosed are methods of making the compounds of formula I and formula II.

Also disclosed are methods of preparing an aldehyde-containing compound, the method comprising contacting an alkene-containing compound with a disclosed cationic transition metal phosphine complexes, e.g., a compound of formula I and/or formula II, in the presence of hydrogen ($H_2$) and carbon monoxide (CO), whereby the alkene is converted to an aldehyde.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims. In addition, all optional and preferred features and modifications of the described embodiments are usable in all aspects of the disclosure taught herein. Furthermore, the individual features of the dependent claims, as well as all optional and preferred features and modifications of the described embodiments are combinable and interchangeable with one another.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIGS. 2A-2B, depicts the structure of exemplary highly active cationic cobalt hydroformylation catalyst precursors of the present disclosure. FIG. 2A depicts the structure of $Co_2(acac)_2(rac\text{-}et,ph\text{-}P4\text{-}Ph)]^{2+}$. FIG. 2B depicts the structure of $[Co(acac)\{(PEt_2)_2(1,2\text{-}C_6H_4)\}]^+$. Both catalysts have $BF_4^-$ counter ions.

FIGS. 4A and 4B, shows the effect of odd electron counts and reactivity. FIG. 4A is a scheme depicting an equilibrium between exemplary catalyst precursors of the present disclosure and carbon monoxide (CO). FIG. 4B is a scheme showing reactivity differences for substitution reactions for 18e– and 17e– complexes.

Figure 1:
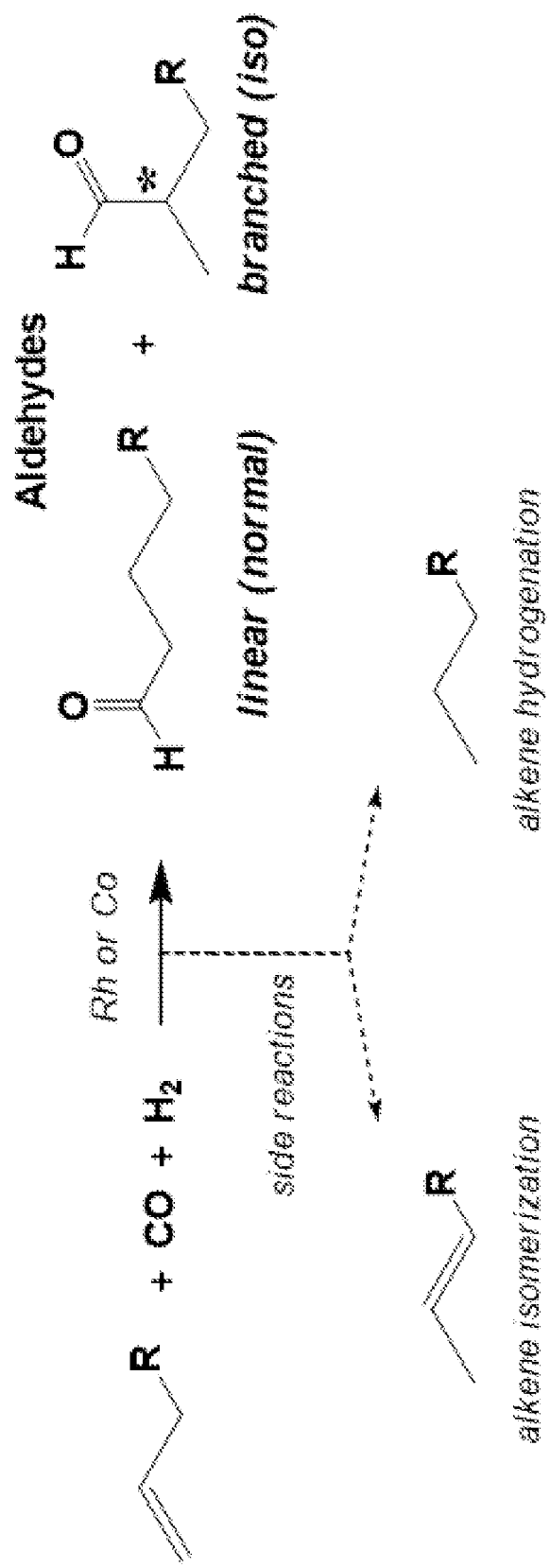
FIG. 1 depicts a hydroformylation reaction.

Additional advantages of the disclosure will be set forth in part in the description which follows, and in part will be obvious from the description, or can be learned by practice of the disclosure. The advantages of the disclosure will be realized and attained by means of the elements and combinations particularly pointed out in the appended claims. It is to be understood that both the foregoing general description and the following detailed description are exemplary and explanatory only and are not restrictive of the disclosure, as claimed.

DETAILED DESCRIPTION

Many modifications and other embodiments disclosed herein will come to mind to one skilled in the art to which the disclosed compositions and methods pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. The skilled artisan will recognize many variants and adaptations of the aspects described herein. These variants and adaptations are intended to be included in the teachings of this disclosure and to be encompassed by the claims herein.

Although specific terms are employed herein, they are used in a generic and descriptive sense only and not for purposes of limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure.

Any recited method can be carried out in the order of events recited or in any other order that is logically possible. That is, unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided herein can be different from the actual publication dates, which can require independent confirmation.

While aspects of the present disclosure can be described and claimed in a particular statutory class, such as the system statutory class, this is for convenience only and one of skill in the art will understand that each aspect of the present disclosure can be described and claimed in any statutory class.

It is also to be understood that the terminology used herein is for the purpose of describing particular aspects only and is not intended to be limiting. Unless defined otherwise, all technical and scientific terms used herein have the same meaning as commonly understood by one of ordinary skill in the art to which the disclosed compositions and methods belong. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

Prior to describing the various aspects of the present disclosure, the following definitions are provided and should be used unless otherwise indicated. Additional terms may be defined elsewhere in the present disclosure.

Definitions

Unless defined otherwise, all technical and scientific terms used herein have the same meaning as commonly understood by one of ordinary skill in the art to which this disclosure belongs. Although any methods and materials similar or equivalent to those described herein can be used in the practice or testing of the present disclosure, the preferred methods and materials are described.

As used herein, each of the following terms has the meaning associated with it in this section.

As used herein, "comprising" is to be interpreted as specifying the presence of the stated features, integers, steps, or components as referred to, but does not preclude the presence or addition of one or more features, integers, steps, or components, or groups thereof. Moreover, each of the terms "by", "comprising," "comprises", "comprised of," "including," "includes," "included," "involving," "involves," "involved," and "such as" are used in their open, non-limiting sense and may be used interchangeably. Further, the term "comprising" is intended to include examples and aspects encompassed by the terms "consisting essentially of" and "consisting of." Similarly, the term "consisting essentially of" is intended to include examples encompassed by the term "consisting of.

The articles "a" and "an" are used herein to refer to one or to more than one (i.e., to at least one) of the grammatical object of the article. By way of example, "an element" means one element or more than one element.

It should be noted that ratios, concentrations, amounts, and other numerical data can be expressed herein in a range format. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. Ranges can be expressed herein as from "about" one particular value, and/or to "about" another particular value. Similarly, when values are expressed as approximations, by use of the antecedent "about," it will be understood that the particular value forms a further aspect. For example, if the value "about 10" is disclosed, then "10" is also disclosed.

When a range is expressed, a further aspect includes from the one particular value and/or to the other particular value. For example, where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In addition, the phrase "about 'x' to 'y'", where 'x' and 'y' are numerical values, includes "about 'x' to about 'y'".

It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to 5%" should be interpreted to include not only the explicitly recited values of about 0.1% to about 5%, but also include individual values (e.g., about 1%, about 2%, about 3%, and about 4%) and the sub-ranges (e.g., about 0.5% to about 1.1%; about 5% to about 2.4%; about 0.5% to about 3.2%, and about 0.5% to about 4.4%, and other possible sub-ranges) within the indicated range.

As used herein, the terms "about," "approximate," "at or about," and "substantially" mean that the amount or value in question can be the exact value or a value that provides equivalent results or effects as recited in the claims or taught herein. That is, it is understood that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In general, an amount, size, formulation, parameter or other quantity or characteristic is "about," "approximate," or "at or about" whether or not expressly stated to be such. It is understood that where "about," "approximate," or "at or about" is used before a quantitative value, the parameter also includes the specific quantitative value itself, unless specifically stated otherwise. In such cases, it is generally understood, as used herein, that "about" and "at or about" mean the nominal value indicated ±10% variation unless otherwise indicated or inferred.

As used herein, the term "alkyl," by itself or as part of another substituent means, unless otherwise stated, a straight or branched chain hydrocarbon having the number of carbon atoms designated (i.e., $C_1$-$C_{10}$ means one to ten carbon atoms) and includes straight, branched chain, or cyclic substituent groups. Examples include methyl, ethyl, propyl, isopropyl, butyl, isobutyl, tert-butyl, pentyl, neopentyl, hexyl, and cyclopropylmethyl. Other examples include ($C_1$-$C_6$)alkyl, such as, but not limited to, ethyl, methyl, isopropyl, isobutyl, n-pentyl, n-hexyl and cyclopropylmethyl.

As used herein, the term "cycloalkyl" refers to a mono cyclic or polycyclic non-aromatic group, wherein each of the atoms forming the ring (i.e. skeletal atoms) is a carbon atom. In one aspect, the cycloalkyl group is saturated or partially unsaturated. In another aspect, the cycloalkyl group is fused with an aromatic ring. Cycloalkyl groups include groups having from 3 to 10 ring atoms. Illustrative examples of cycloalkyl groups include, but are not limited to, the following moieties:

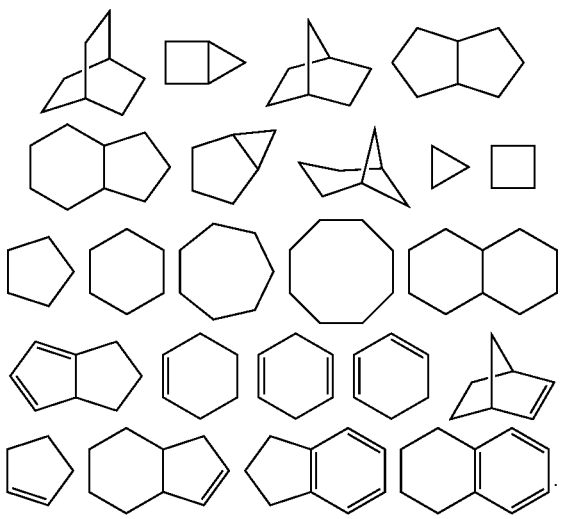

Monocyclic cycloalkyls include, but are not limited to, cyclopropyl, cyclobutyl, cyclopentyl, cyclohexyl, cycloheptyl, and cyclooctyl. Dicyclic cycloalkyls include, but are not limited to, tetrahydronaphthyl, indanyl, and tetrahydropentalene. Polycyclic cycloalkyls include adamantine and norbornane. The term cycloalkyl includes "unsaturated nonaromatic carbocyclyl" or "nonaromatic unsaturated carbocyclyl" groups, both of which refer to a nonaromatic carbocycle as defined herein, which contains at least one carbon-carbon double bond or one carbon-carbon triple bond.

As used herein, the term "alkenyl," employed alone or in combination with other terms, means, unless otherwise stated, a stable mono-unsaturated or di-unsaturated straight chain or branched chain hydrocarbon group having the stated number of carbon atoms. Examples include vinyl, propenyl (or allyl), crotyl, isopentenyl, butadienyl, 1,3-pentadienyl, 1,4-pentadienyl, and the higher homologs and isomers. A functional group representing an alkene is exemplified by —$CH_2$—CH=$CH_2$.

As used herein, the term "alkynyl," employed alone or in combination with other terms, means, unless otherwise stated, a stable straight chain or branched chain hydrocarbon group with a triple carbon-carbon bond, having the stated number of carbon atoms. Non-limiting examples include ethynyl and propynyl, and the higher homologs and isomers. The term "propargylic" refers to a group exemplified by —$CH_2$—C≡CH. The term "homopropargylic" refers to a group exemplified by —$CH_2CH_2$—C≡CH. The term "substituted propargylic" refers to a group exemplified by —$CR_2$—C≡CR, wherein each occurrence of R is independently H, alkyl, substituted alkyl, alkenyl or substituted alkenyl, with the proviso that at least one R group is not hydrogen. The term "substituted homopropargylic" refers to a group exemplified by —$CR_2CR_2$—C≡CR, wherein each occurrence of R is independently H, alkyl, substituted alkyl, alkenyl or substituted alkenyl, with the proviso that at least one R group is not hydrogen.

As used herein, the term "substituted alkyl," "substituted cycloalkyl," "substituted alkenyl" or "substituted alkynyl" means alkyl, cycloalkyl, alkenyl or alkynyl, as defined above, substituted by one, two or three substituents. In one aspect, the substituents are selected from the group consisting of halogen, —OH, alkoxy, tetrahydro-2-H-pyranyl, —$NH_2$, —N($CH_3$)$_2$, (1-methyl-imidazol-2-yl), pyridin-2-yl, pyridin-3-yl, pyridin-4-yl, —C(=O)OH, trifluoromethyl, —C≡N, —C(=O)O($C_1$-$C_4$)alkyl, —C(=O)$NH_2$, —C(=O)NH($C_1$-$C_4$)alkyl, —C(=O)N(($C_1$-$C_4$)alkyl)$_2$, —$SO_2NH_2$, —C(=NH)$NH_2$, and —$NO_2$, In one aspect, one or two substituents are present and include halogen, —OH, alkoxy, —$NH_2$, trifluoromethyl, —N($CH_3$)$_2$, and —C(=O) OH. In one aspect, the substituents include halogen, alkoxy and —OH. Examples of substituted alkyls include, but are not limited to, 2,2-difluoropropyl, 2-carboxycyclopentyl and 3-chloropropyl.

As used herein, the term "alkoxy" employed alone or in combination with other terms means, unless otherwise stated, an alkyl group having the designated number of carbon atoms, as defined above, connected to the rest of the molecule via an oxygen atom, such as, for example, methoxy, ethoxy, 1-propoxy, 2-propoxy (isopropoxy) and the higher homologs and isomers. Non-limiting examples include ($C_1$-$C_3$)alkoxy, such as, but not limited to, ethoxy and methoxy.

As used herein, the term "halo" or "halogen" alone or as part of another substituent means, unless otherwise stated, a fluorine, chlorine, bromine, or iodine atom. In one aspect, halo includes fluorine, chlorine, or bromine. In one aspect, halo includes fluorine or chlorine.

As used herein, the term "heteroalkyl" by itself or in combination with another term means, unless otherwise stated, a stable straight or branched chain alkyl group consisting of the stated number of carbon atoms and one or two heteroatoms selected from the group consisting of B, O, N, S, and P and wherein the nitrogen, sulfur, and phosphorous atoms may be optionally oxidized and the nitrogen heteroatom may be optionally quaternized. The heteroatom(s) may be placed at any position of the heteroalkyl group, including between the rest of the heteroalkyl group and the fragment to which it is attached, as well as attached to the most distal carbon atom in the heteroalkyl group. Examples include: —O—CH$_2$—CH$_2$—CH$_3$, —CH$_2$—CH$_2$—CH$_2$—OH, —CH$_2$—CH$_2$—NH—CH$_3$, —CH$_2$—S—CH$_2$—CH$_3$, and —CH$_2$CH$_2$—S(=O)—CH$_3$. Up to two heteroatoms may be consecutive, such as, for example, —CH$_2$—NH—OCH$_3$, or —CH$_2$—CH$_2$—S—S—CH$_3$ As used herein, the term "heteroalkenyl" by itself or in combination with another term means, unless otherwise stated, a stable straight or branched chain monounsaturated or di-unsaturated hydrocarbon group consisting of the stated number of carbon atoms and one or two heteroatoms selected from the group consisting of B, O, N, S, and P and wherein the nitrogen, sulfur, and phosphorous atoms may optionally be oxidized and the nitrogen heteroatom may optionally be quaternized. Up to two heteroatoms may be placed consecutively. Examples include —CH=CH—O—CH$_3$, —CH=CH—CH$_2$—OH, —CH$_2$—CH=N—OCH$_3$, —CH=CH—N(CH$_3$)—CH$_3$, and —CH$_2$—CH=CH—CH$_2$—SH.

As used herein, the term "aromatic" refers to a carbocycle or heterocycle with one or more polyunsaturated rings and having aromatic character, i.e., having (4n+2) delocalized p (pi) electrons, where n is an integer.

As used herein, the term "aryl," employed alone or in combination with other terms, means, unless otherwise stated, a carbocyclic aromatic system containing one or more rings (typically one, two or three rings) wherein such rings may be attached together in a pendent manner, such as a biphenyl, or may be fused, such as naphthalene. Examples include phenyl, anthracyl, and naphthyl. In one aspect, aryl includes phenyl and naphthyl. In one aspect, the aryl is phenyl.

As used herein, the term "aryl-(C$_1$-C$_3$)alkyl" or "arylalkyl" means a functional group wherein a one to three carbon alkylene chain is attached to an aryl group, e.g., —CH$_2$CH$_2$-phenyl or —CH$_2$-phenyl (benzyl). Preferred is aryl-CH$_2$— and aryl-CH(CH$_3$)—. The term "substituted aryl-(C$_1$-C$_3$) alkyl" means an aryl-(C$_1$-C$_3$)alkyl functional group in which the aryl group is substituted. In one aspect, the arylalkyl is substituted aryl(CH$_2$)—. Similarly, the term "heteroaryl-(C$_1$-C$_3$)alkyl" means a functional group wherein a one to three carbon alkylene chain is attached to a heteroaryl group, e.g., —CH$_2$CH$_2$-pyridyl. In one aspect, the heteroaryl-(C$_1$-C$_3$)alkyl is heteroaryl-(CH$_2$)—. The term "substituted heteroaryl-(C$_1$-C$_3$)alkyl" means a heteroaryl-(C$_1$-C$_3$)alkyl functional group in which the heteroaryl group is substituted. In one aspect, the substituted heteroaryl-(C$_1$-C$_3$)alkyl is substituted heteroaryl-(CH$_2$)—.

As used herein, the term "heterocycle" or "heterocyclyl" or "heterocyclic" by itself or as part of another substituent means, unless otherwise stated, an unsubstituted or substituted, stable, mono- or multi-cyclic heterocyclic ring system that consists of carbon atoms and at least one heteroatom selected from the group consisting of B, O, N, S, and P and wherein the nitrogen, sulfur, and phosphorous heteroatoms may be optionally oxidized, and the nitrogen atom may be optionally quaternized. The heterocyclic system may be attached, unless otherwise stated, at any heteroatom or carbon atom that affords a stable structure. A heterocycle may be aromatic or non-aromatic in nature. In one aspect, the heterocycle is a heteroaryl. A polycyclic heteroaryl may include one or more rings that are partially saturated. Examples include the following moieties:

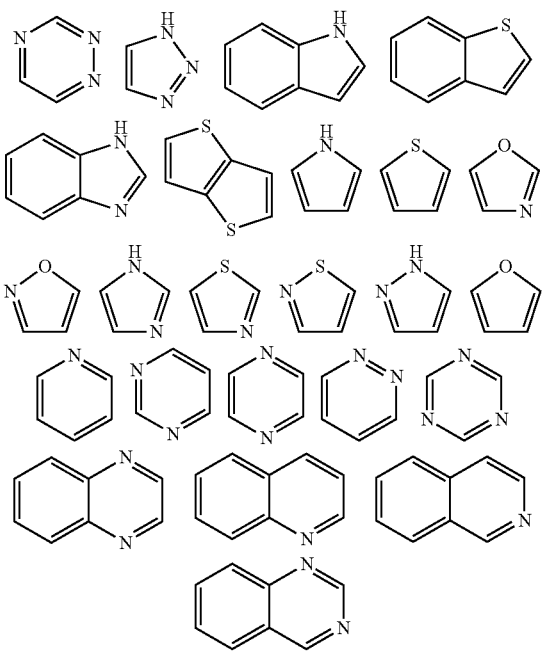

As used herein, the term "heterocycloalkyl" or "heterocyclyl" refers to a heteroalicyclic group containing one to four ring heteroatoms each selected from B, O, S, N, and P. In one aspect, each heterocycloalkyl group has from 4 to 10 atoms in its ring system, with the proviso that the ring of said group does not contain two adjacent O or S atoms. In another aspect, the heterocycloalkyl group is fused with an aromatic ring. In one aspect, the nitrogen and sulfur heteroatoms may be optionally oxidized, and the nitrogen atom may be optionally quaternized. The heterocyclic system may be attached, unless otherwise stated, at any heteroatom or carbon atom that affords a stable structure. A heterocycle may be aromatic or non-aromatic in nature. In one aspect, the heterocycle is a heteroaryl.

An example of a 3-membered heterocycloalkyl group includes, and is not limited to, aziridine. Examples of 4-membered heterocycloalkyl groups include, and are not limited to, azetidine and a beta lactam. Examples of 5-membered heterocycloalkyl groups include, and are not limited to, pyrrolidine, oxazolidine and thiazolidinedione. Examples of 6-membered heterocycloalkyl groups include, and are not limited to, piperidine, morpholine and piperazine. Other non-limiting examples of heterocycloalkyl groups are:

-continued

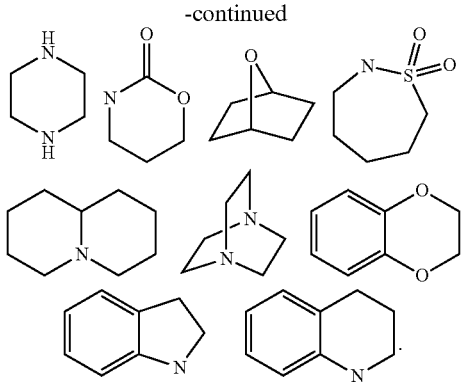

Examples of non-aromatic heterocycles include monocyclic groups such as aziridine, oxirane, thiirane, azetidine, oxetane, thietane, pyrrolidine, pyrroline, pyrazolidine, imidazoline, dioxolane, sulfolane, 2,3-dihydrofuran, 2,5-dihydrofuran, tetrahydrofuran, thiophane, piperidine, 1,2,3,6-tetrahydropyridine, 1,4-dihydropyridine, piperazine, morpholine, thiomorpholine, pyran, 2,3-dihydropyran, tetrahydropyran, 1,4-dioxane, 1,3-dioxane, homopiperazine, homopiperidine, 1,3-dioxepane, 4,7-dihydro-1,3-dioxepin, and hexamethyleneoxide.

As used herein, the term "heteroaryl" or "heteroaromatic" refers to a heterocycle having aromatic character. A polycyclic heteroaryl may include one or more rings that are partially saturated. Examples include the following moieties:

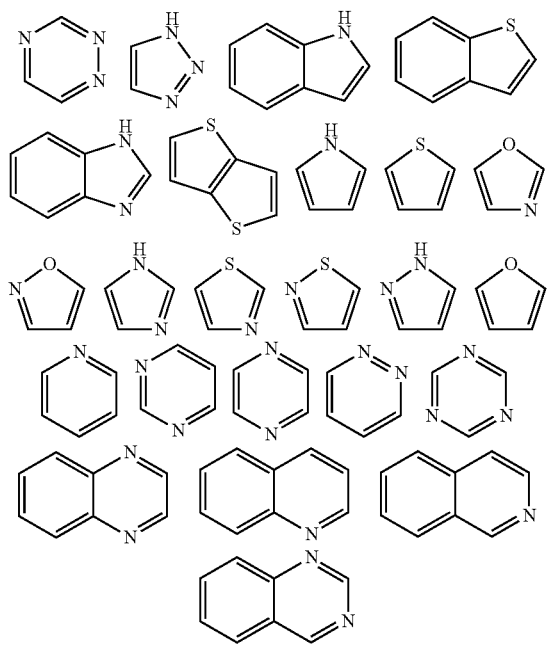

Examples of heteroaryl groups include pyridyl, pyrazinyl, pyrimidinyl (such as, but not limited to, 2- and 4-pyrimidinyl), pyridazinyl, thienyl, furyl, pyrrolyl, imidazolyl, thiazolyl, oxazolyl, pyrazolyl, isothiazolyl, 1,2,3-triazolyl, 1,2,4-triazolyl, 1,3,4-triazolyl, tetrazolyl, 1,2,3-thiadiazolyl, 1,2,3-oxadiazolyl, 1,3,4-thiadiazolyl and 1,3,4-oxadiazolyl.

Examples of polycyclic heterocycles include indolyl (such as, but not limited to, 3-, 4-, 5-, 6- and 7-indolyl), indolinyl, quinolyl, tetrahydroquinolyl, isoquinolyl (such as, but not limited to, 1- and 5-isoquinolyl), 1,2,3,4-tetrahydroisoquinolyl, cinnolinyl, quinoxalinyl (such as, but not limited to, 2- and 5-quinoxalinyl), quinazolinyl, phthalazinyl, 1,8-naphthyridinyl, 1,4-benzodioxanyl, coumarin, dihydrocoumarin, 1,5-naphthyridinyl, benzofuryl (such as, but not limited to, 3-, 4-, 5-, 6- and 7-benzofuryl), 2,3-dihydrobenzofuryl, 1,2-benzisoxazolyl, benzothienyl (such as, but not limited to, 3-, 4-, 5-, 6-, and 7-benzothienyl), benzoxazolyl, benzothiazolyl (such as, but not limited to, 2-benzothiazolyl and 5-benzothiazolyl), purinyl, benzimidazolyl, benztriazolyl, thioxanthinyl, carbazolyl, carbolinyl, acridinyl, pyrrolizidinyl, and quinolizidinyl.

The aforementioned listing of heterocyclyl and heteroaryl moieties is intended to be representative and not limiting.

As used herein, the term "substituted" means that an atom or group of atoms has replaced hydrogen as the substituent attached to another group. The term "substituted" further refers to any level of substitution, namely mono-, di-, tri-, tetra-, or penta-substitution, where such substitution is permitted. The substituents are independently selected, and substitution may be at any chemically accessible position. In one aspect, the substituents vary in number between one and four. In another aspect, the substituents vary in number between one and three. In yet another aspect, the substituents vary in number between one and two.

As used herein, the term "optionally substituted" means that the referenced group may be substituted or unsubstituted. In one aspect, the referenced group is optionally substituted with zero substituents, i.e., the referenced group is unsubstituted. In another aspect, the referenced group is optionally substituted with one or more additional group(s) individually and independently selected from groups described herein.

In one aspect, the substituents are independently selected from the group consisting of oxo, halogen, —CN, —NH$_2$, —OH, —NH(CH$_3$), —N(CH$_3$)$_2$, alkyl (including straight chain, branched and/or unsaturated alkyl), substituted or unsubstituted cycloalkyl, substituted or unsubstituted heterocycloalkyl, fluoro alkyl, substituted or unsubstituted heteroalkyl, substituted or unsubstituted alkoxy, fluoroalkoxy, —S-alkyl, S(=O)$_2$alkyl, —C(=O)NH[substituted or unsubstituted alkyl, or substituted or unsubstituted phenyl], —C(=O)N[H or alkyl]$_2$, —OC(=O)N[substituted or unsubstituted alkyl]$_2$, —NHC(=O)NH[substituted or unsubstituted alkyl, or substituted or unsubstituted phenyl], —NHC(=O)alkyl, —N[substituted or unsubstituted alkyl]C(=O)[substituted or unsubstituted alkyl], —NHC(=O)[substituted or unsubstituted alkyl], —C(OH)[substituted or unsubstituted alkyl]$_2$, and —C(NH$_2$)[substituted or unsubstituted alkyl]$_2$. In one aspect, by way of example, an optional substituent is selected from oxo, fluorine, chlorine, bromine, iodine, —CN, —NH$_2$, —OH, —NH(CH$_3$), —N(CH$_3$)$_2$, —CH$_3$, —CH$_2$CH$_3$, —CH(CH$_3$)$_2$, —CF$_3$, —CH$_2$CF$_3$, —OCH$_3$, —OCH$_2$CH$_3$, —OCH(CH$_3$)$_2$, —OCF$_3$, —OCH$_2$CF$_3$, —S(=O)$_2$—CH$_3$, —SO$_3$H, —C(=O)NH$_2$, —C(=O)—NHCH$_3$, —NHC(=O)NHCH$_3$, —C(=O)CH$_3$, and —C(=O)OH. In one aspect, the substituents are independently selected from the group consisting of C$_{1-6}$ alkyl, —OH, C$_{1-6}$ alkoxy, halo, amino, acetamido, oxo and nitro. In yet another aspect, the substituents are independently selected from the group consisting of C$_{1-6}$ alkyl, C$_{1-6}$ alkoxy, halo, acetamido, and nitro. As used herein, where a substituent is an alkyl or alkoxy group, the carbon chain may be branched, straight or cyclic, with straight being preferred. In one aspect, the substituents are positively or negatively charged groups consisting of —NR₃⁺, —SO₃⁻, or related species.

For aryl, aryl-(C₁-C₃)alkyl and heterocyclyl groups, the term "substituted" as applied to the rings of these groups refers to any level of substitution, namely mono-, di-, tri-, tetra-, or penta-substitution, where such substitution is permitted. The substituents are independently selected, and substitution may be at any chemically accessible position. In one aspect, the substituents vary in number between one and four. In one aspect, the substituents vary in number between one and three. In one aspect, the substituents vary in number between one and two.

As used herein, the terms "DPPBz," "DEPBz," "dppe," and "depe" refer to the structures shown by the formulas as follows:

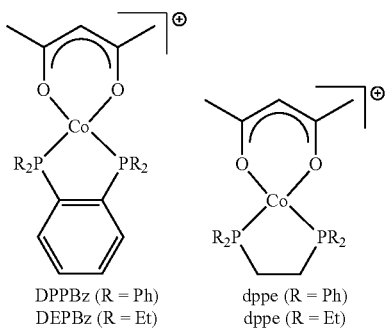

DPPBz (R = Ph)
DEPBz (R = Et)

dppe (R = Ph)
dppe (R = Et)

In the foregoing, "Ph" refers to a phenyl group, and "Et" refers to an ethyl group. That is, "Ph" represents the structure shown by the following formula:

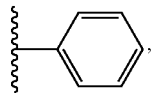

and

"Et" represents the structure shown by the following formula:

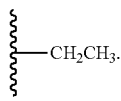

Unless otherwise specified, temperatures referred to herein are based on atmospheric pressure (i.e. one atmosphere).

In various aspects, the present disclosure relates in part to highly active cationic cobalt phosphine complexes, both mono- and bimetallic, that can catalyze hydroformylation reactions. The disclosed catalysts can be utilized in methods that provide reaction processes that are hundreds of times faster than high pressure HCo(CO)₄ or phosphine-modified HCo(CO)₃(PR₃) catalysts and operate at considerably lower pressures and temperatures. Thus, the present disclosure is related in part to methods of hydroformylation.

Compounds of the Disclosure

The compounds of the present disclosure may be synthesized using techniques well-known in the art of organic synthesis. The starting materials and intermediates required for the synthesis may be obtained from commercial sources or synthesized according to methods known to those skilled in the art.

In various aspects, the present disclosure relates to a compound of formula I, or a salt, solvate, or stereoisomer thereof:

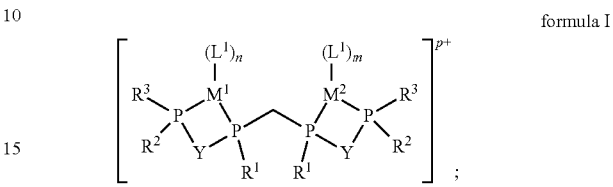

formula I wherein in formula I: X is selected from the group consisting of O, NR⁸, and CR⁹R¹⁰, wherein R⁸, R⁹, and R¹⁰ can be the same or different and are each independently selected from the group consisting of H, C₁-C₅ alkyl, C₂-C₅ alkenyl, C₁-C₅ alkoxy, C₁-C₂₀ alcohol, C₃-C₆ cycloalkyl, C₃-C₆ cycloalkoxy, C₆-C₁₀ aryl, C₆-C₁₀ alkaryl, C₆-C₁₀ aralkyl, C₄-C₁₀ heteroaryl, and combinations thereof; or optionally R⁹ and R¹⁰ can together form a C₃-C₆ cycloalkyl ring; each occurrence of Y independently represents a divalent linking group selected from the group consisting of C₁-C₆ alkyl, C₁-C₆ alkenyl, C₆-C₁₄ aryl, C₄-C₁₄ heteroaryl, O, NR⁴, and combinations thereof; each occurrence of R¹, R², R³, and R⁴ is independently selected from the group consisting of C₁-C₂₀ alkyl, C₁-C₈ alkoxy, C₁-C₂₀ alcohol, C₃-C₆ cycloalkyl, C₃-C₆ cycloalkoxy, C₆-C₁₀ aryl, C₆-C₁₀ alkaryl, C₆-C₁₀ aralkyl, C₄-C₁₀ heteroaryl, and combinations thereof; or R² and R³ may optionally be joined together to form a ring; or optionally one of R¹ and one of either R⁹ or R¹⁰ may together form a ring; M¹ and M² each independently represent a transition metal selected from the group consisting of Fe, Co, Ni, Cu, Ru, Rh, Pd, Ir, and Pt, and M¹ and M² can be the same or different; n is an integer between 0 and 4, wherein the value of the number n for the ligand L¹ depends on the transition metal M¹ and is selected such that the transition metal M¹ has 14, 15, 16, 17, 18, or 19 valence electrons; m is an integer between 0 and 4, wherein the value of the number m for the ligand L² depends on the transition metal M² and is selected such that the transition metal M² has 14, 15, 16, 17, 18, or 19 valence electrons; p is an integer between 0 and 4; and L¹ and L² can be the same or different and each occurrence is independently selected from the group consisting of trialkylphosphine, tricycloalkylphosphine, diethyl ether, tetrahydrofuran, H₂O, CO, acetylacetonate, acetate, C₁-C₆ alkoxide, acetonitrile, cyclooctadiene, N(R¹¹)₃, N(R¹¹)₂, C₁-C₆ alkyl, C₄-C₁₀ heteroaryl, C₄-C₁₀ heterocycle, H, Cl, Br, I, and F; wherein R¹¹ is H, alkyl, cycicoalkyl, heteroalkyl, or heterocyclic.

In a further aspect, X is CR⁹R¹⁰. In one aspect, R⁹ and R¹⁰ are each hydrogen. In one aspect, R² and R³ are each C₁-C₅ alkyl. In one aspect, R² and R³ are each ethyl. In one aspect, R¹ is phenyl. In one aspect, Y is 1,2-phenylene, which is optionally substituted. In one aspect, M¹ and M² are each independently selected from the group consisting of Co and Rh. In one aspect, p is 2. In one aspect, L¹ and L² are each independently selected from the group consisting of acetoacetonate, acetonitrile, pyridine, and cyclooctadiene.

In a still further aspect, X is selected from NR⁸ and CR⁹R¹⁰, wherein each of R⁸, R⁹, and R¹⁰ is independently selected from the group consisting of H, C₁-C₁₂ alkyl, $C_1$-$C_{20}$ alcohol, $C_3$-$C_6$ cycloalkyl, $C_6$-$C_{10}$ aryl, and $C_6$-$C_{10}$ alkyl-substituted aryl (with $C_1$-$C_{12}$ alkyls), and wherein $R^9$ and $R^{10}$ can form a $C_3$-$C_6$ cycloalkyl ring. In a yet further aspect, X is selected from $NR^8$ and $CR^9R^{10}$, wherein each of $R^8$, $R^9$, and $R^{10}$ is independently selected from the group consisting of H, $C_4$-$C_{12}$ alkyl, $C_4$-$C_{12}$ alcohol, $C_6$ cycloalkyl, $C_6$-$C_{10}$ aryl, and $C_6$-$C_{10}$ alkyl-substituted aryl (with $C_1$-$C_6$ alkyls), and wherein $R^9$ and $R^{10}$ can form a $C_5$-$C_6$ cycloalkyl ring. In a further aspect, X is selected from $C_6$-$C_{10}$ aryl and $C_6$-$C_{10}$ alkyl-substituted aryl (with $C_1$-$C_{12}$ alkyls).

In a further aspect, Y is selected from $C_2$-$C_6$ alkyl, $C_2$-$C_6$ alkenyl, $C_6$-$C_{10}$ aryl, and $C_6$-$C_{10}$ alkyl-substituted aryl (with $C_1$-$C_{12}$ alkyls). In a still further aspect, Y is selected from $C_2$-$C_3$ alkyl, $C_2$-$C_4$ alkenyl, $C_6$-$C_{10}$ aryl, and $C_6$-$C_{10}$ alkyl-substituted aryl (with $C_1$-$C_6$ alkyls). In a yet further aspect, Y is selected from $C_6$-$C_{10}$ aryl and $C_6$-$C_{10}$ alkyl-substituted aryl (with $C_1$-$C_{12}$ alkyls).

In a further aspect, each of $R^1$, $R^2$, $R^3$, and $R^4$ is independently selected from the group consisting of $C_1$-$C_{12}$ alkyl, $C_1$-$C_{20}$ alcohol, $C_3$-$C_6$ cycloalkyl, $C_6$-$C_{10}$ aryl, and $C_6$-$C_{10}$ alkyl-substituted aryl (with $C_1$-$C_{12}$ alkyls); or $R^2$ and $R^3$ may optionally be joined together to form a ring. In a still further aspect, each of $R^1$, $R^2$, $R^3$, and $R^4$ is independently selected from the group consisting $C_2$-$C_8$ alkyl, $C_2$-$C_{10}$ alcohol, $C_5$-$C_6$ cycloalkyl, $C_6$-$C_{10}$ aryl, $C_6$-$C_{10}$ alkyl-substituted aryl (with $C_1$-$C_6$ alkyls), and combinations thereof; or $R^2$ and $R^3$ may optionally be joined together to form a ring.

In a further aspect, each of $M^1$ and $M^2$ are independently are a transition metal selected from the group consisting of Fe, Co, Ni, Ru, Rh, and Pd, wherein $M^1$ and $M^2$ can be the same or different. In some aspects, each of $M^1$ and $M^2$ are different. For example, each of $M^1$ and $M^2$ are independently are a transition metal selected from the group consisting of Fe, Ni, Co, Ru, Rh, and Pd, such that $M^1$ and $M^2$ are different transition metals. In other aspects, each of each of $M^1$ and $M^2$ are the same. For example, each of $M^1$ and $M^2$ are the same transition metal selected from the group consisting of Fe, Ni, Co, Ru, Rh, and Pd. In a still further aspect, each of $M^1$ and $M^2$ are independently are a transition metal selected from the group consisting of Fe, Co, Ru, Rh, and Pd, and $M^1$ and $M^2$ can be the same or different. In some aspects, each of $M^1$ and $M^2$ are different. For example, each of $M^1$ and $M^2$ are independently are a transition metal selected from the group consisting of Fe, Co, Ru, Rh, and Pd, such that $M^1$ and $M^2$ are different transition metals. In other aspects, each of each of $M^1$ and $M^2$ are the same. For example, each of $M^1$ and $M^2$ are the same transition metal selected from the group consisting of Fe, Co, Ru, Rh, and Pd. In a yet further aspect, each of $M^1$ and $M^2$ is Co.

In a further aspect, for each occurrence of $L^1$ and $L^2$ is independently selected from the group consisting of trialkylphosphine, tetrahydrofuran, $H_2O$, CO, acetylacetonate, $C_1$-$C_6$ alkoxide, acetonitrile, cyclooctadiene, $N(R^{11})_3$, $N(R^{11})_2$, $C_1$-$C_6$ alkyl, $C_4$-$C_{10}$ heteroaryl, $C_4$-$C_{10}$ heterocycle, H, Cl, Br, I, and F; wherein $R^{11}$ is H, alkyl, cycicoalkyl, heteroalkyl, and heterocyclic, wherein each occurrence of $L^1$ and $L^2$ be the same or different. In a still further aspect, for each occurrence of $L^1$ and $L^2$ is independently selected from the group consisting of tetrahydrofuran, $H_2O$, CO, acetylacetonate, $C_1$-$C_6$ alkoxide, acetonitrile, $N(R^{11})_2$, $C_1$-$C_6$ alkyl, H, Cl, Br, I, and F; wherein $R^{11}$ is H, alkyl, cycicoalkyl, heteroalkyl, and heterocyclic, wherein each occurrence of $L^1$ and $L^2$ be the same or different.

In a further aspect, the compound of formula I is selected from the group consisting of:

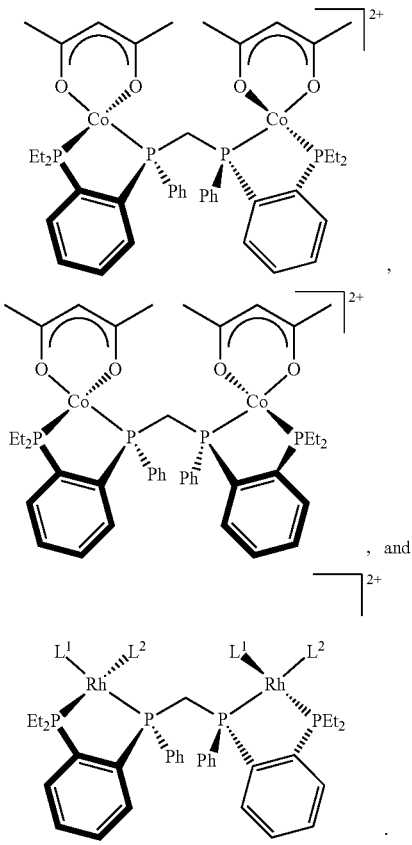

, and

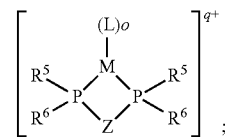

.

In various aspects, the present disclosure relates to a compound of formula (II), or a salt, solvate, or stereoisomer thereof:

formula II $$\left[ \begin{array}{c} (L)o \\ R^5 \diagdown \overset{M}{\underset{Z}{\diagup}} \diagdown R^5 \\ R^6 \diagup P \diagdown R^6 \end{array} \right]^{q+}$$

;

wherein in formula (II): each occurrence of $R^5$ and $R^6$ is independently selected from the group consisting of $C_1$-$C_{20}$ alkyl, $C_1$-$C_8$ alkoxy, $C_1$-$C_{20}$ alcohol, $C_3$-$C_6$ cycloalkyl, $C_3$-$C_6$ cycloalkoxy, $C_6$-$C_{10}$ aryl, $C_6$-$C_{10}$ alkaryl, $C_6$-$C_{10}$ aralkyl, or combinations thereof; or $R^5$ and $R^6$ may optionally be joined together to form a ring; Z represents a divalent linking group selected from the group consisting of $C_1$-$C_6$ alkyl, $C_1$-$C_6$ alkenyl, $C_6$-$C_{14}$ aryl, $C_4$-$C_{14}$ heteroaryl, O, $NR^4$, and combinations thereof; M is a transition metal selected from the group consisting of Fe, Co, Ni, Cu, Ru, Rh, Pd, Ir, and Pt; o is an integer between 0 and 4, wherein the value of the number o for the ligand L depends on the transition metal M and is selected such that the transition metal M has 14, 15, 16, 17, 18, or 19 valence electrons; q is an integer between 0 and 4; and each occurrence of L can be the same or different and is selected from the group consisting of trialkylphosphine, tricycloalkylphosphine, diethyl ether, tetrahydrofuran, H$_2$O, CO, acetylacetonate, acetate, C$_1$-C$_6$ alkoxide, acetonitrile, cyclooctadiene, N(R$^{11}$)$_3$, N(R$^{11}$)$_2$, C$_1$-C$_6$ alkyl, C$_4$-C$_{10}$ heteroaryl, C$_4$-C$_{10}$ heterocycle, H, Cl, Br, I, and F; wherein R$^{11}$ is H, alkyl, cycicoalkyl, heteroalkyl, or heterocyclic.

In a further aspect, o is an integer between 1 and 3, wherein the value of the number o for the ligand L depends on the transition metal M and is selected such that the transition metal M has 15, 16, 17, 18, or 19 valence electrons. In a still further aspect, o is an integer between 2 and 3, wherein the value of the number o for the ligand L depends on the transition metal M and is selected such that the transition metal M has 15, 16, 17, 18, or 19 valence electrons.

In a further aspect, q is an integer selected from 0, 1, 2, and 3. In a still further aspect, q is an integer selected from 0, 1, and 2.

In a further aspect, the compound of formula (II) is selected from the group consisting of:

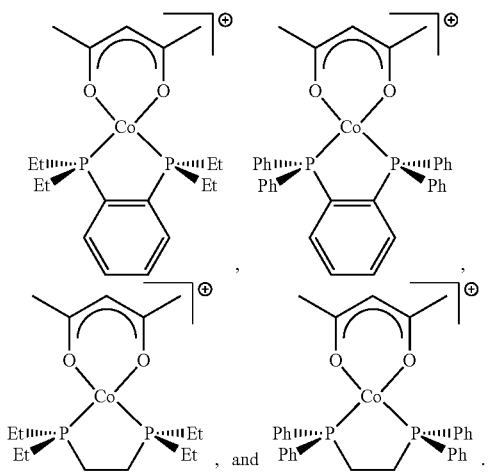

In a further aspect, each occurrence of R$^5$ and R$^6$ is independently selected from the group consisting of C$_1$-C$_{18}$ alkyl, C$_1$-C$_{20}$ alcohol, C$_3$-C$_6$ cycloalkyl, C$_6$-C$_{10}$ aryl, and C$_6$-C$_{10}$ alkyl-substituted aryl (with C$_1$-C$_{12}$ alkyls); and wherein R$^5$ and R$^6$ may optionally be joined together to form a ring. In a still further aspect, each occurrence of R$^5$ and R$^6$ is independently selected from the group consisting of C$_2$-C$_{12}$ alkyl, C$_1$-C$_{12}$ alcohol, C$_5$-C$_6$ cycloalkyl, C$_6$-C$_{10}$ aryl, C$_6$-C$_{10}$ alkyl-substituted aryl (with C$_1$-C$_6$ alkyls), or combinations thereof; or wherein R$^5$ and R$^6$ may optionally be joined together to form a ring. In a yet further aspect, each occurrence of R$^5$ and R$^6$ is independently selected from a C$_6$-C$_{10}$ alkyl-substituted aryl (with C$_1$-C$_6$ alkyls). In a still further aspect, R$^5$ and R$^6$ are each C$_1$-C$_6$ alkyl, phenyl, or cycloalkyl, each of which may be optionally substituted.

In a further aspect, Z is a divalent linking group selected from the group consisting of C$_2$-C$_4$ alkyl, C$_2$-C$_6$ alkenyl, C$_6$-C$_{14}$ aryl, and combinations thereof. In a still further aspect, Z is a divalent linking group selected from the group consisting of C$_2$-C$_3$ alkyl, C$_2$-C$_4$ alkenyl, C$_6$-C$_{14}$ aryl, and combinations thereof. In a yet further aspect, Z is 1,2-phenylene, 1,2-ethylene, or 1,3-propylene.

In a further aspect, M is a transition metal selected from the group consisting of Fe, Co, Ni, Ru, Rh, Pd, and Ir. In a still further aspect, M is a transition metal selected from the group consisting of Fe, Co, Ru, Rh, and Pd. In a yet further aspect, M is Co. In a further aspect, M is Rh or Co.

In a further aspect, each occurrence of L can be the same or different and each occurrence is independently selected from the group consisting of trialkylphosphine, tetrahydrofuran, H$_2$O, CO, acetylacetonate, C$_1$-C$_6$ alkoxide, acetonitrile, cyclooctadiene, N(R$^{11}$)$_3$, N(R$^{11}$)$_2$, C$_1$-C$_6$ alkyl, C$_4$-C$_{10}$ heteroaryl, C$_4$-C$_{10}$ heterocycle, H, Cl, Br, I, and F; wherein R$^{11}$ is H, alkyl, cycicoalkyl, heteroalkyl, or heterocyclic. In a still further aspect, each occurrence of L can be the same or different and each occurrence is independently selected from the group consisting of tetrahydrofuran, H$_2$O, CO, acetylacetonate, C$_1$-C$_6$ alkoxide, acetonitrile, N(R$^{11}$)$_2$, C$_1$-C$_6$ alkyl, H, Cl, Br, I, and F; wherein R$^{11}$ is H, alkyl, cycicoalkyl, heteroalkyl, or heterocyclic.

In a further aspect, one or more occurrence of L, L$^1$, or L$^2$ represents a neutral electron donor ligand. Non-limiting examples of suitable ligands include those containing an atom, such as oxygen, nitrogen, phosphorous or sulfur, which has a non-bonded electron pair. Examples of such ligands include, but are not limited to, ethers, amines, phosphines, and thioethers. In one aspect, the electron donor ligand is a tricycloalkyl-, triaryl-, or trialkylphosphine. In one aspect, the electron donor ligand is a solvent molecule such as tetrahydrofuran (THF), H$_2$O, MeOH, or EtOH. In one aspect, the electron donor ligand is a ligand containing one or more π-bonds, such as alkenyl, alkynyl, aryl, and the like. In one aspect, the electron donor ligand is a heterocyclic or heteroaryl compound containing a non-bonded electron pair, as would be understood by one of skill in the art. In one aspect, the electron donor ligand is a bidentate electron donor ligand such as ethylene diamine, phenanthroline, 2,2'-bipyridine, and the like. In one aspect, the neutral electron donor ligand is a ligand that exhibits backbonding, such as CO.

In a further aspect, one or more occurrence of L, L$^1$, or L$^2$ represents an anionic ligand. Exemplary anionic ligands include, but are not limited to, hydrogen, substituted or unsubstituted alkyl, halo, hydroxy, alkoxy, aryloxy, silyl, amide, phosphide, cyano, nitrite, or combinations thereof. In one aspect, the anionic ligand is an alkyl ligand such as methyl, ethyl, propyl, butyl, amyl, isoamyl, hexyl, iso-butyl, heptyl, octyl, nonyl, decyl, cetyl, 2-ethylhexyl, phenyl and the like. In one aspect, the anionic ligand is a halogen such as F, Cl, Br, or I. In one aspect, the anionic ligand is an alkoxide such as methoxide, ethoxide, phenoxide, or substituted phenoxide. In one aspect, the anionic ligand is an amide such as dimethylamide, diethylamide, methylethylamide, di-t-butylamide, diisopropylamide, and the like. In one aspect, the anionic ligand is a phosphide such as diphenylphosphide, dicyclohexylphosphide, diethylphosphide, dimethylphosphide and the like. In one aspect, the anionic ligand is cyclopentadienyl. In one aspect, the ligand L represents a bidentate anionic ligand such as acetylacetonate, glycinate (or other comparable amino acid), and the like. In a still further aspect, L is acetylacetonate.

In a further aspect, one or more occurrence of L$^1$ or L$^2$ represents a bridging ligand coordinating to both of M$^1$ and M$^2$. Exemplary bridging ligands include, but are not limited to, hydroxyl, alkoxyl, oxide, hydrosulfyl, sulfalkyl, amide, alkylamide, nitride, halo, hydrogen, nitrile, CO, 1,2-pyrazine, 1,3-pyrazine, 1,4-pyrazine, and the like.

In a further aspect, the divalent linking groups Y in formula (I) is 1,2-phenylene. In one aspect, the divalent linking group Z in formula (II) is 1,2-phenylene. In one aspect, the divalent linking group is 1,2-ethylene, 1,3-propylene, or 1,4-butylene. In one aspect, the divalent linking group is not methylene. In one aspect, the divalent linking group imposes a chelate upon the metal center.

In a further aspect, the substituents $R^2$, $R^3$, $R^5$, and $R^6$ are selected so as to not create a steric block on the axial coordination site of the metal. In one aspect, $R^2$, $R^3$, $R^5$, and $R^6$ are independently selected from the group consisting of linear alkyl groups, cycloalkyl groups having no substitution at the 2-position, and unsubstituted aryl groups or aryl groups not substituted at the 2-position. In one aspect, $R^2$ and $R^3$, or $R^5$ and $R^6$, together form a ring having no additional substitution. In one aspect, $R^2$ and/or $R^3$ forms a bond with an atom on divalent linking group Y. In one aspect, $R^5$ and/or $R^6$ forms a bond with an atom on divalent linking group Z. In one aspect, a bond connecting divalent group Y with at least one of $R^2$ or $R^3$, or a bond connecting divalent group Z with at least one of $R^5$ or $R^6$, further limits steric incumbency on the axial coordination site of the metal.

In a further aspect, the compound of formula I or the compound of formula (II) further comprises a weakly coordinating anion, which may be any suitable anion known for this purpose, as would be understood by one of ordinary skill in the art. In one aspect, the weakly coordination anion is a bulky anion or an anion with a delocalized negative charge. Exemplary weakly coordinating anions include, but are not limited to, tetrakis [3,5-bis(trifluoromethyl)phenyl]borate (herein referred to as BArF$^-$), (phenyl)$_4$B$^-$, (C$_6$F$_6$)$_4$B$^-$, (CH$_3$)(C$_6$F$_5$)$_3$B$^-$, PF$_6^-$, BF$_4^-$, SbF$_6^-$, trifluoromethanesulfonate (herein referred to as triflate or OTf$^-$), and p-toluenesulfonate (herein referred to as tosylate or OTs$^-$).

In a further aspect, the ligands L, $L^1$, and $L^2$ and the integers n, m, o, p, and q are selected in order to control the number of electrons on the transition metal M. In one aspect, the number of electrons on the transition metal M is 14, 15, 16, 17, 18, or 19, depending on the application of the compound or the reaction conditions, as would be understood by one of skill in the art. In one aspect, p is 1, 2, 3, or 4. In one aspect, p is 2 or 4. In one aspect, q is 1 or 2. In one aspect, q is 1. In one aspect, a localized cationic charge of +1 to +3 on the metal center is important for high catalyst activity.

The compounds of the disclosure may possess one or more stereocenters, and each stereocenter may exist independently in either the R or S configuration. In one aspect, compounds described herein are present in optically active, racemic, or meso diastereomeric forms. It is to be understood that the compounds described herein encompass racemic, optically-active, regioisomeric and stereoisomeric forms, or combinations thereof that possess the catalytically useful properties described herein. Preparation of optically active forms is achieved in any suitable manner, including by way of non-limiting example, by resolution of the racemic form with recrystallization techniques, synthesis from optically-active starting materials, chiral synthesis, or chromatographic separation using a chiral stationary phase. In one aspect, a mixture of one or more isomer is utilized as the compound described herein. In another aspect, compounds described herein contain one or more chiral centers. These compounds are prepared by any means, including stereoselective synthesis, enantioselective synthesis and/or separation of a mixture of enantiomers and/or diastereomers. Resolution of compounds and isomers thereof is achieved by any means including, by way of non-limiting example, chemical processes, enzymatic processes, fractional crystallization, distillation, and chromatography.

The methods and formulations described herein include the use of N-oxides (if appropriate), crystalline forms (also known as polymorphs), solvates, amorphous phases, and/or salts of compounds having the structure of any compound of the disclosure, as well as analogs of these compounds having the same type of activity. Solvates include water, ether (e.g., tetrahydrofuran, methyl tert-butyl ether, dioxane) or alcohol (e.g., ethanol) solvates, acetates and the like. In one aspect, the compounds described herein exist in solvated forms with solvents such as water, diethyl ether, tetrahydrofuran, dioxane, and ethanol. In another aspect, the compounds described herein exist in unsolvated form.

In one aspect, the compounds of the disclosure may exist as tautomers. All tautomers are included within the scope of the compounds presented herein.

The compounds described herein, and other related compounds having different substituents are synthesized using techniques and materials described, for example, in Fieser & Fieser's Reagents for Organic Synthesis, Volumes 1-17 (John Wiley and Sons, 1991); Rodd's Chemistry of Carbon Compounds, Volumes 1-5 and Supplementals (Elsevier Science Publishers, 1989); Organic Reactions, Volumes 1-40 (John Wiley and Sons, 1991), Larock's Comprehensive Organic Transformations (VCH Publishers Inc., 1989), March, Advanced Organic Chemistry 4$^{th}$ Ed., (Wiley 1992); Carey & Sundberg, Advanced Organic Chemistry 4th Ed., Vols. A and B (Plenum 2000, 2001), and Green & Wuts, Protective Groups in Organic Synthesis 3rd Ed., (Wiley 1999) (all of which are incorporated by reference for such disclosure). General methods for the preparation of compound described herein are modified by the use of appropriate reagents and conditions, for the introduction of the various moieties found in the formula as provided herein.

Compounds described herein are synthesized using any suitable procedures starting from compounds that are available from commercial sources.

In one aspect, reactive functional groups, such as hydroxyl, amino, imino, thio or carboxy groups, can be protected in order to avoid their unwanted participation in reactions. Protecting groups are used to block some or all of the reactive moieties and prevent such groups from participating in chemical reactions until the protective group is removed. In another aspect, each protective group is removable by a different means. Protective groups that are cleaved under totally disparate reaction conditions fulfill the requirement of differential removal.

In one aspect, protective groups are removed by acid, base, reducing conditions (such as, for example, hydrogenolysis), and/or oxidative conditions. Groups such as trityl, dimethoxytrityl, acetal and t-butyldimethylsilyl are acid labile and are used to protect carboxy and hydroxy reactive moieties in the presence of amino groups protected with Cbz groups, which are removable by hydrogenolysis, and Fmoc groups, which are base labile. Carboxylic acid and hydroxy reactive moieties are blocked with base labile groups such as, but not limited to, methyl, ethyl, and acetyl, in the presence of amines that are blocked with acid labile groups, such as t-butyl carbamate, or with carbamates that are both acid and base stable but hydrolytically removable.

In one aspect, carboxylic acid and hydroxy reactive moieties are blocked with hydrolytically removable protective groups such as the benzyl group, while amine groups capable of hydrogen bonding with acids are blocked with base labile groups such as Fmoc. Carboxylic acid reactive moieties are protected by conversion to simple ester compounds as exemplified herein, which include conversion to alkyl esters, or are blocked with oxidatively-removable protective groups such as 2,4-dimethoxybenzyl, while co-existing amino groups are blocked with fluoride labile silyl carbamates.

Allyl blocking groups are useful in the presence of acid- and base-protecting groups since the former are stable and are subsequently removed by metal or pi-acid catalysts. For example, an allyl-blocked carboxylic acid is deprotected with a palladium-catalyzed reaction in the presence of acid labile t-butyl carbamate or base-labile acetate amine protecting groups. Yet another form of protecting group is a resin to which a compound or intermediate is attached. As long as the residue is attached to the resin, that functional group is blocked and does not react. Once released from the resin, the functional group is available to react.

Typically blocking/protecting groups may be selected from:

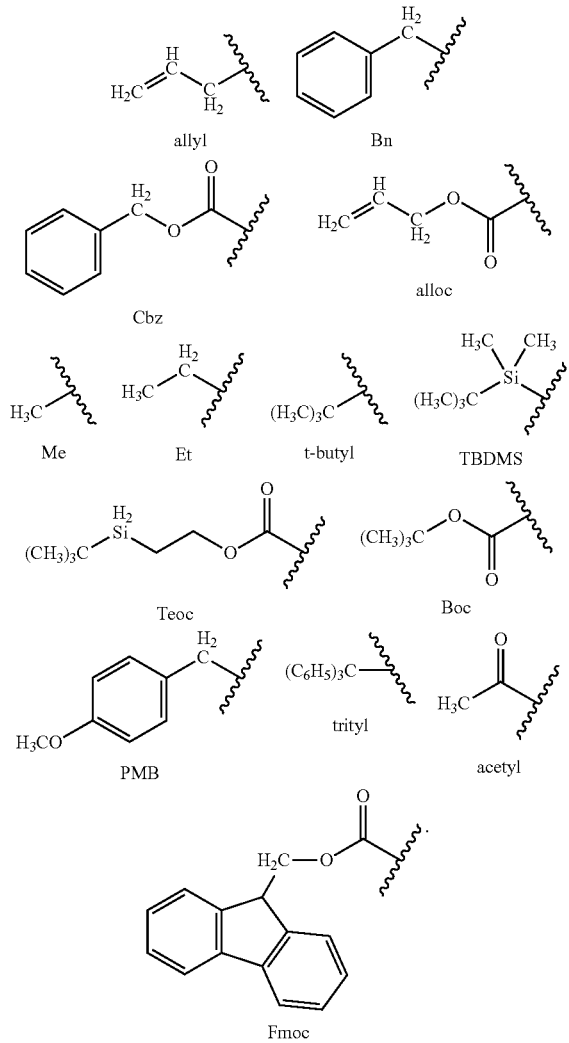

Other protecting groups, plus a detailed description of techniques applicable to the creation of protecting groups and their removal are described in Greene & Wuts, Protective Groups in Organic Synthesis, 3rd Ed., John Wiley & Sons, New York, NY, 1999, and Kocienski, Protective Groups, Thieme Verlag, New York, NY, 1994, which are incorporated herein by reference for such disclosure.

The compounds described herein may form salts with acids or bases, and such salts are included in the present disclosure. The term "salts" embraces addition salts of free acids or free basis that are useful within the methods of the disclosure. Salts may possess properties such as high crystallinity, which have utility in the practice of the present disclosure, such as for example utility in process of synthesis or purification of compounds useful within the methods of the disclosure.

Suitable salts may be prepared from an inorganic acid or from an organic acid. Examples of inorganic acids include perchlorate, hydrochloric, hydrobromic, hydriodic, nitric, carbonic, sulfuric, and phosphoric acids. Appropriate organic acids may be selected from aliphatic, cycloaliphatic, aromatic, araliphatic, heterocyclic, carboxylic and sulfonic classes of organic acids, examples of which include formic, acetic, propionic, succinic, glycolic, gluconic, lactic, malic, tartaric, dibenzoyltartaric, dibenzyltartaric, benzoyltartaric, benzyltartaric, citric, ascorbic, glucuronic, maleic, fumaric, pyruvic, aspartic, glutamic, benzoic, anthranilic, 4-hydroxybenzoic, phenylacetic, mandelic, embonic (pamoic), methanesulfonic, ethanesulfonic, benzenesulfonic, pantothenic, trifluoromethanesulfonic, 2-hydroxyethanesulfonic, p-toluenesulfonic, sulfanilic, cyclohexylaminosulfonic, stearic, alginic, β-hydroxybutyric, salicylic, galactaric and galacturonic acid.

Methods of the Disclosure

The disclosure also includes methods hydroformylation. The methods may be performed using compounds described herein. As would be understood by one of ordinary skill in the art, the compounds described herein are useful as catalysts in the methods and reactions of the present disclosure. In one aspect, the disclosure includes isomerization of alkenes by movement of the double bond to other locations. In another aspect, the disclosure includes hydrogenation of aldehydes to form alcohols.

In one aspect, the present disclosure relates to a method of preparing an aldehyde-containing compound. In one aspect, the method includes contacting an alkene-containing compound with a compound of the disclosure in the presence of hydrogen ($H_2$) and carbon monoxide (CO), whereby the alkene is converted to an aldehyde. In one aspect, the compound of the disclosure is a catalyst. In one aspect, the compound of the disclosure is a homogenous catalyst. In one aspect, the catalyst is highly active. In one aspect, the alkene-containing compound is contacted with the compound of the disclosure in a chemical reaction.

In one aspect, the methods of this disclosure contemplate using the highly active catalysts of the present disclosure for converting alkene-containing compounds to aldehydes, in some cases with high linear:branched (L:B) selectivity, by reacting the alkene-containing compounds with a compound of the disclosure in the presence of $H_2$ and CO. In one aspect, the reaction occurs in a homogeneous reaction phase. In one aspect, the catalyst or a catalyst precursor is introduced into an autoclave or reaction vessel dissolved in a liquid medium, or slurried, or otherwise dispersed in a liquid medium to eventually provide a homogeneous reaction phase. Suitable solvents are, e.g., alcohols, ethers, ketones, paraffins, cycloparaffins, aromatic hydrocarbons, and the like. In one aspect, the solvent comprises water. In one aspect, the solvent comprises acetone. In one aspect, the solvent comprises acetonitrile. In one aspect, the solvent comprises dimethoxytetraethylene glycol (t-glyme). In one aspect the solvent comprises propylene carbonate. In one aspect the solvent comprises water. In one aspect the solvent comprises a water-acetone mixture. In one aspect, the water-acetone mixture includes 10 to 50% water by volume.

In one aspect, the compounds of the present disclosure are pre-catalysts. In one aspect, the compounds of the present disclosure are converted to active catalysts upon exposure to reaction conditions. In one aspect, the compounds of the present disclosure are converted to active catalysts upon exposure to CO and/or $H_2$.

In one aspect, the alkene-containing compound comprises alkenes such as alpha olefins (i.e., olefins unsaturated in the 1-position), particularly straight chain alpha olefins having from 2 to about 20 carbon atoms ($C_2$-$C_{20}$). In one aspect, the straight chain alpha olefins have from 2 to 12 carbon atoms ($C_2$-$C_{12}$). Alpha olefins are characterized by a terminal double bond, i.e., $CH_2$=CH—R. In some aspects, the alpha olefins may be substituted if the substituents do not interfere in the hydroformylation reaction. Exemplary substituents include carbonyl, carbonyloxy, oxy, hydroxy, alkoxy, phenyl and the like. Exemplary alpha olefins, include alkenes, alkyl alkenoates, alkenyl alkyl ethers, alkenols, and the like, e.g., ethylene, propene, 1-butene, 1-pentene, 1-hexene, 1-heptene, 1-octene, vinyl acetate, allyl alcohol, and the like. In one aspect, the alkene-containing compound comprises more than one alkene compound. In one aspect, the alkene-containing compound comprises more than one alkene functional group. In one aspect, the alkene-containing compound has at least one branching group within 1, 2, 3, or 4 carbon atoms from the terminal alkene.

In one aspect, the alkene-containing compound comprises internal double bonds (i.e., internal alkene). In one aspect, there are no branches between the internal alkene and at least one terminal position of the compound. In one aspect, the catalysts of the present disclosure isomerize the internal alkene into a terminal alkene. In one aspect, the catalysts of the present disclosure hydroformylate the isomerized terminal alkene.

In one aspect, at least one reactant comprises an alkyne, including, but not limited to alkyl, carbonyl, carbonyloxy, oxy, hydroxy, alkoxy, or phenyl alkynes. In one aspect, the hydroformylation of an alkyne generates an $\alpha,\beta$-unsaturated aldehyde.

In one aspect, the alkene-containing compound is contacted with the catalyst at temperature and pressure sufficient to convert the alkene to an aldehyde, as would be understood by one of ordinary skill in the art. In one aspect, the temperature of the reaction ranges from about 50° C. to about 200° C. In one aspect, the temperature of the reaction ranges from about 60° C. to about 180° C. In one aspect, the temperature of the reaction ranges from about 80° C. to about 160° C. In one aspect, the temperature of the reaction ranges from about 100° C. to about 160° C. In one aspect, the temperature of the reaction ranges from about 120° C. to about 160° C.

In one aspect, the alkene-containing compound is contacted with the compound of the disclosure in a reaction vessel, such as would be understood by one of skill in the art. In one aspect, the pressure of the reaction vessel ranges from about 5 bar to about 150 bar. In one aspect, the pressure of the reaction vessel ranges from about 25 to 70 bar. In one aspect, the initial turnover frequency of the catalyst of the present disclosure increases with increasing reaction vessel pressure.

The ratio of $H_2$:CO can be any ratio that is sufficient to promote the conversion of the alkene to an aldehyde, as would be understood by one of ordinary skill in the art. In one aspect, the ratio of $H_2$:CO ranges from about 10:90 to about 90:10 volume percent. In one aspect, the ratio of $H_2$:CO ranges from about 40:60 to 60:40 volume percent. In one aspect, higher ratios may result in greater hydrogenation of aldehydes to alcohols.

In one aspect, the catalyst is employed in the reaction mixture in concentrations ranging from about $10^{-6}$ M to about $10^{-2}$ M (molar). In one aspect, the catalyst is added to the reaction vessel as a slurry or a solution, and the reaction is pressurized and brought to the desired operating temperature. In one aspect, the alkene-containing compound, carbon monoxide, and hydrogen are combined in desired ratios are then introduced into the reaction vessel to commence the reaction. In one aspect, alkenes that are liquids at or near room temperature (e.g., 1-hexene, 1-octene) are introduced to the reaction zone prior to charging the $H_2$ and CO gases. In one aspect, the process is suited to batch-wise operation. In another aspect, the reaction is conducted under continuous operation via the use of suitable apparatus such as a flow reactor.

In one aspect, the reactions using the catalyst compounds described herein result in low to very low alkene hydrogenation side reactions. In one aspect, the reactions using the catalyst compounds described herein result in high linear: branched ratios. In one aspect, the reactions using the catalyst compounds described herein with internal alkenes with $C_1$-$C_6$ alkyl branches located near the double bond result in high linear:branched ratios. In one aspect, the catalyst compounds described herein reduce aldehydes to alcohol. In one aspect, the catalyst compounds described herein convert terminal alkenes to internal (non-terminal, thermodynamically favored) alkenes. In one aspect, the catalysts described herein do not decompose over at least 150,000 turnovers. In one aspect, the catalysts are active in alkene isomerization.

In one aspect, reactions using the catalysts described herein partially convert aldehydes from hydroformylation into alcohols. In one aspect, all aldehyde products are converted to alcohols via a reduction reaction. In one aspect, the reduction of the aldehydes requires no additional catalyst(s). In one aspect, the reduction of the aldehydes to alcohols occurs in the presence of the catalyst of the present disclosure. In one aspect, the reduction of the aldehyde to alcohol is not catalyzed. In one aspect, the reduction of the aldehydes to alcohols is improved by addition of at least one additional catalyst. In one aspect, the at least one additional catalyst does not impact the hydroformylation reaction.

A person skilled in the art recognizes, or is able to ascertain using no more than routine experimentation, numerous equivalents to the specific procedures, aspects, claims, and examples described herein. Such equivalents were considered to be within the scope of this disclosure and covered by the claims appended hereto. For example, it should be understood, that modifications in reaction conditions, including but not limited to reaction times, reaction size/volume, and experimental reagents, such as solvents, catalysts, pressures, atmospheric conditions, e.g., nitrogen atmosphere, and reducing/oxidizing agents, with art-recognized alternatives and using no more than routine experimentation, are within the scope of the present application.

It is to be understood that wherever values and ranges are provided herein, all values and ranges encompassed by these values and ranges, are meant to be encompassed within the scope of the present disclosure. Moreover, all values that fall within these ranges, as well as the upper or lower limits of a range of values, are also contemplated by the present application.

From the foregoing, it will be seen that aspects herein are well adapted to attain all the ends and objects hereinabove set forth together with other advantages which are obvious and which are inherent to the structure.

While specific elements and steps are discussed in connection to one another, it is understood that any element and/or steps provided herein is contemplated as being combinable with any other elements and/or steps regardless of explicit provision of the same while still being within the scope provided herein.

It will be understood that certain features and sub-combinations are of utility and may be employed without reference to other features and sub-combinations. This is contemplated by and is within the scope of the present disclosure.

Since many possible aspects may be made without departing from the scope thereof, it is to be understood that all matter herein set forth or shown in the accompanying drawings and detailed description is to be interpreted as illustrative and not in a limiting sense.

It is also to be understood that the terminology used herein is for the purpose of describing particular aspects only, and is not intended to be limiting. The skilled artisan will recognize many variants and adaptations of the aspects described herein. These variants and adaptations are intended to be included in the teachings of this disclosure and to be encompassed by the claims herein.

Now having described the aspects of the present disclosure, in general, the following Examples describe some additional aspects of the present disclosure. While aspects of the present disclosure are described in connection with the following examples and the corresponding text and figures, there is no intent to limit aspects of the present disclosure to this description. On the contrary, the intent is to cover all alternatives, modifications, and equivalents included within the spirit and scope of the present disclosure.

EXAMPLES

The disclosure is further described in detail by reference to the following experimental examples. These examples are provided for purposes of illustration only, and are not intended to be limiting unless otherwise specified. Thus, the disclosure should in no way be construed as being limited to the following examples, but rather, should be construed to encompass any and all variations which become evident as a result of the teaching provided herein.

Without further description, it is believed that one of ordinary skill in the art can, using the preceding description and the following illustrative examples, make and utilize the compounds of the present disclosure and practice the claimed methods. The following working examples therefore, specifically point out the preferred aspects of the present disclosure, and are not to be construed as limiting in any way the remainder of the disclosure.

Example 1: Cobalt Hydroformylation of 1-Alkenes

Cationic monometallic and bimetallic bis(phosphine)-chelated cobalt catalysts that perform hydroformylation under far lower temperatures and pressures than known systems using neutral cobalt catalysts, and with far higher activities, have been identified and are described herein. An exemplary hydroformylation reaction is shown in FIG. 1. The catalysts of the present disclosure are also active in alkene isomerization with little alkene hydrogenation observed, which is desirable for current processes. The catalysts partially convert aldehydes generated from hydroformylation into desired alcohol products in the presence of hydrogen. Though linear to branched (L:B) regioselectivities of 0.8:1 to 1.4:1 were observed in the aldehyde products derived from 1-alkenes, the chelating bisphosphine ligand may be modified to yield higher aldehyde L:B ratios with 1-alkenes.

Figure 2:
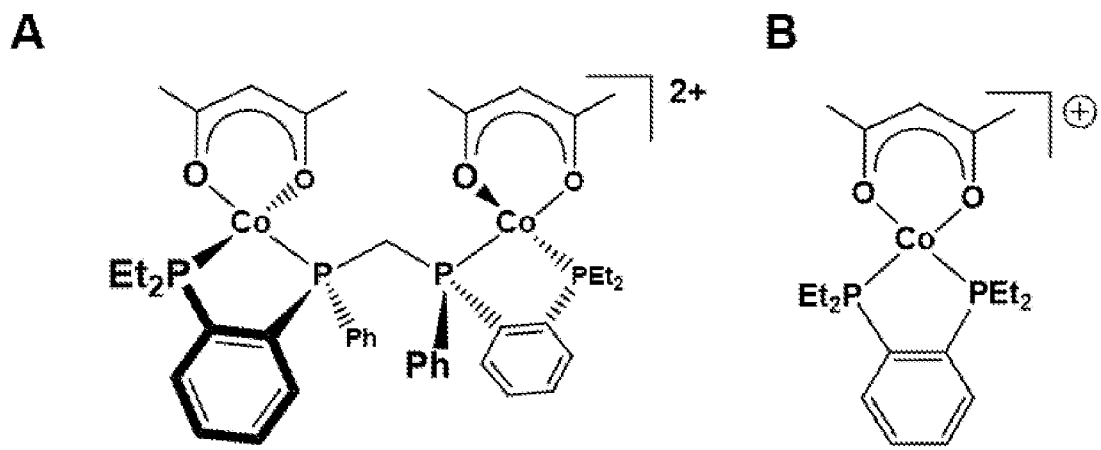
FIG. 2 comprising

The development of dicationic dicobalt catalysts are based on the stronger coordinating tetraphosphine ligands, rac- and meso-$(Et_2P)(1,2-C_6H_4)P(Ph)CH_2P(Ph)(1,2-C_6H_4)$ $(PEt_2)$, et,ph-P4-Ph. The synthesis and characterization of this ligand has been reported. (Schreiter, et al., Inorg. Chem., 2014, 53, 10036-10038). The disclosed dicobalt complexes rac- and meso-$[Co_2(acac)_2(et,ph-P4-Ph)](BF_4)_2$ are described herein. The monometallic version of the dicobalt catalyst, $[Co(acac)\{(PEt_2)_2(1,2-C_6H_4)\}](BF_4)$, is more active than the bimetallic system, particularly on a per-cobalt atom basis. Structural drawings of the rac-$Co_2$ complex and monometallic precursor complexes studied are shown in FIG. 2. These complexes generate far more active hydroformylation catalysts that operate under milder conditions relative to the known monometallic cobalt catalysts currently in use.

The cationic cobalt bisphosphine chelated catalysts described herein operate between 120 and 160° C. with $H_2$/CO pressures of 25 to 85 bar for liquid alkenes. The catalyst appears to run about 100 to 1000 times faster than a model Shell catalyst that has been tested under Shell conditions (180-190° C., 65 bar, 23 mM or 2000 ppm Co, $P(n-Bu)_3$, P:Co=1.3:1). Unlike the Shell catalyst, the catalysts described herein result in low linear to branched (L:B) regioselectivities (around 1:1) with 1-alkenes like 1-hexene. The catalysts described herein are also active at alkene isomerization, similar to the commercial $HCo(CO)_4$ and $HCo(CO)_3(PR_3)$ catalysts. The catalysts also can partially hydrogenate aldehydes to alcohols, a process that is still under investigation. Notably, the mild reaction conditions used herein, when applied to the unchelated complex $HCo(CO)_4$ generated from $Co_2(CO)_8$, results in decomposition to cobalt metal. The catalysts described herein can be used with low catalyst loadings without sacrificing activity, unlike the Shell catalyst, which requires fairly high cobalt and phosphine concentrations in order to form the proper active catalyst equilibrium. The catalysts described herein have been used with 0.0001% catalyst loading (0.006 mM or 6 μM) and did 179,000 turnovers over 41 hours with no sign of catalyst decomposition.

The results from several hydroformylation runs using $[Co(acac)\{(Et_2P)_2-1,2-C_6H_4\}](BF_4)$ and 1-hexene at different pressures is shown in Table 1.

TABLE 1

Pressure Effect in Hydroformylation of 1-Hexene using $[Co(acac)\{(Et_2P)_2-1,2-C_6H_4\}](BF_4)$ at 160° C. (1M 1-hexene, 1 mM Co, 1:1 $H_2$/CO, t-glyme solvent).

| Pressure (bar) | Time | Initial TOF (min$^{-1}$) | L:B | % Aldehyde | % Alcohol | % iso* | % hydro* |
|---|---|---|---|---|---|---|---|
| 27.6 | 10 min | 26.8 | | 26.8 | 0 | 62.6 | 0.8 |
| | 2 hr | | 0.92 | 67.2 | 4.7 | 25.3 | 1.9 |
| 34.5 | 10 min | 31.4 | | 31.4 | 0 | 56.1 | 0.8 |
| | 2 hr | | 0.97 | 78.2 | 6.0 | 13.5 | 1.8 |

TABLE 1-continued

Pressure Effect in Hydroformylation of 1-Hexene using [Co(acac){(Et$_2$P)$_2$-1,2-C$_6$H$_4$}](BF$_4$) at 160° C. (1M 1-hexene, 1 mM Co, 1:1 H$_2$/CO, t-glyme solvent).

| Pressure (bar) | Time | Initial TOF (min$^{-1}$) | L:B | % Aldehyde | % Alcohol | % iso* | % hydro* |
|---|---|---|---|---|---|---|---|
| 51.7 | 10 min | 42.0 | | 42.0 | 0 | 38.0 | 0.8 |
| | 2 hr | | 1.1 | 85.5 | 6.0 | 6.7 | 1.4 |
| 68.9 | 10 min | 46.8 | | 46.8 | 0 | 29.8 | 0.8 |
| | 2 hr | | 1.3 | 87.9 | 4.4 | 6.2 | 1.3 |

*iso = alkene isomerization;
hydro = alkene hydrogenation

Example 2: Cobalt Hydroformylation of Internal Branched Alkenes

The cationic cobalt catalysts described herein have excellent activity and much higher L:B selectivity for difficult to hydroformylate internal branched alkenes like 2-methyl-2-butene. Hydroformylation runs with 2-methyl-2-butene were done with [Co(acac)(dppe)](BF$_4$), dppe=Et$_2$PCH$_2$CH$_2$PEt$_2$, and Rh(acac)(CO)$_2$+PPh$_3$. The following reaction conditions were utilized: (a) HRh(CO)(PPh$_3$)$_2$: 1 mM Rh(acac)(CO)$_2$, 0.4 M PPh$_3$, 400:1 PPh$_3$:Rh, 1 M 2-methyl-2-butene, 100° C., 7.9 bar, 1:1 H$_2$/CO in toluene; and (b) [HCo(CO)(dppe)](BF$_4$): 1 mM [Co(acac)(dppe)](BF$_4$), 1 M 2-methyl-2-butene, 140° C., 34.5 bar, 1:1 H$_2$/CO in t-glyme. Using the foregoing, it was observed that there was no hydroformylation activity by the industrial Rh/PPh$_3$ catalyst, no observed alkene isomerization and no alkene hydrogenation. The cationic cobalt-dppe catalyst did 286 turnovers after 3 hours (28.6% conversion) with 11:1 L:B (based on NMR and GC/MS). Less than 1% alkene hydrogenation and less than 1% hydrogenation of the aldehyde to make alcohol was observed using the disclosed catalyst precursor.

Example 3: Representative Active Catalysts

A variety of chelating bisphosphine ligands were examined for their effect on the hydroformylation activity and selectivity of the monometallic cationic Co(II) catalyst system (BF$_4^-$ counter-anion, other non-coordination anions should work well). The initial hypothesis was that the extremely strong chelate effect of 1,2-phenylene-linked bisphosphines was critically important in stabilizing the low-spin, cationic Co(II) oxidation state; however, further studies demonstrated that other chelating bisphosphine ligands work well. The strength of the bisphosphine chelate, is clearly important for the overall catalyst stability, but the effect of the phosphine R-groups is even more dramatic.

The following phosphines have been tested using the cationic cobalt(II) acac catalyst precursor motif. The most successful ligands, which have a bridging 1,2-phenylene or saturated alkyl group, generate active cationic Co(II) hydroformylation catalysts. All have similar L:B selectivities around 1:1 for simple 1-alkenes (e.g., 1-hexene).

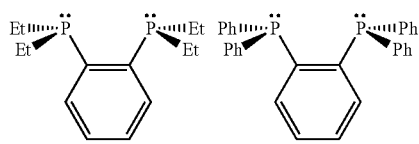

-continued

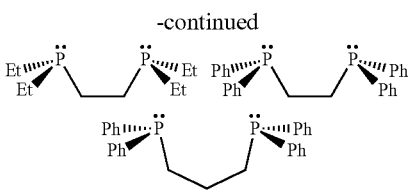

The 1,2-phenylene-linked bisphosphines were found to exhibit higher stability at higher temperatures (e.g., 160° C.). Although not wishing to be bound by any particular theory, the strong chelate effect for these phosphines appears to play an important role in inhibiting catalyst decomposition reactions. The ethylene- and propylene-based chelating bisphosphines work well at lower temperatures (140° C.), but show more tendency to decomposition reactions as the temperature approaches 160° C., with extensive catalyst degradation above 160° C. The more electron-rich alkylate phosphines show hydroformylation activity at lower temperatures (120° C.) relative to the phenyl-substituted ligands that do not start hydroformylating until around 140° C.

The bisphosphine ligands that generate less active cationic Co(II) hydroformylation catalysts are shown below. A common feature that connects these chelating phosphines is the size of the substituents. Without wishing to be bound by a particular theory, it is possible that once a certain R-group steric threshold is passed, hydroformylation activity becomes more limited.

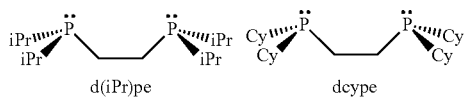
d(iPr)pe     dcype

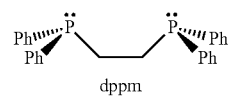
dppm

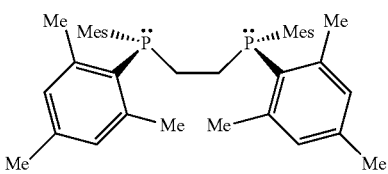

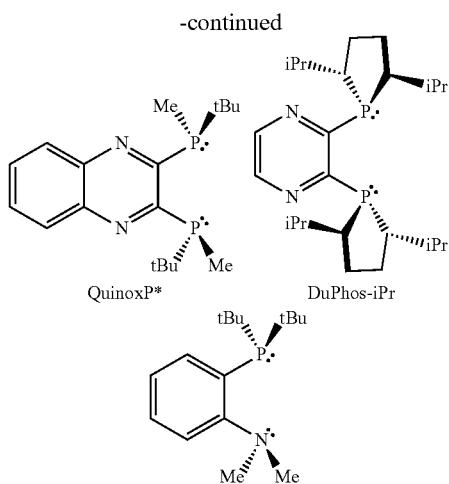

QuinoxP*  DuPhos-iPr

Figure 3:
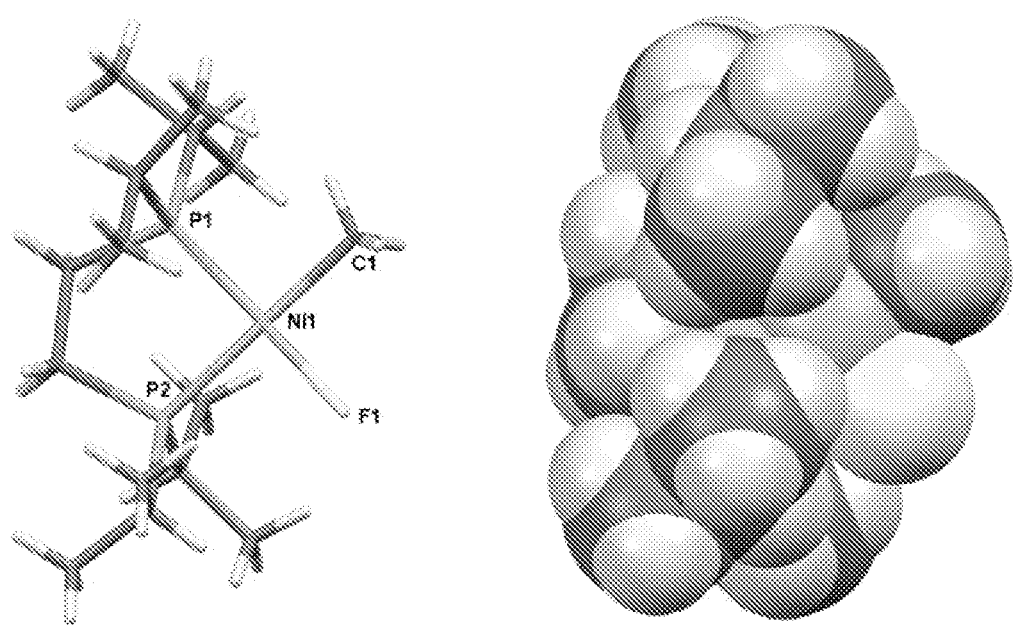
FIG. 3 depicts the crystal structure of $Ni(F)(CH_3)[d(iPr)pe]$ showing stick and space-filling models with the same orientation.

There are high quality crystal structures of first- and second-row metal complexes with many of these ligands, one example is: Ni(F)(CH$_3$)[d(iPr)pe], d(iPr)pe=(iPr)$_2$PCH$_2$CH$_2$P(iPr)$_2$, (REFCODE=CAQVIA; Cámpora, eta al., Organometallics, 2005, 24, 2827). Stick and space-filing models from the X-ray structure of Ni(F)(CH$_3$)[d(iPr)pe] are shown in FIG. 3 to show the blocking of axial coordination sites on the nickel center.

In one aspect, a common feature of all the ligands tested that generate less active cationic cobalt(II) hydroformylation catalysts is that they block the axial coordination sites enough so that CO cannot coordinate to the axial sites. Although not wishing to be bound by any particular theory, CO coordination to both of the axial sites appears to be critically important for the functioning of the cationic catalyst described herein.

Table 1 shows the effect of pressure on the hydroformylation of 1-hexene at 160° C. using the (Et$_2$P)$_2$-1,2-C$_6$H$_4$ ligand system. The initial turnover frequency (TOF) steadily increases with increasing partial CO pressure. The L:B ratio slightly increases at 1000 psig H$_2$/CO to 1.3:1, consistent with better CO migratory insertion for the linear alkyl intermediate and reduced alkene isomerization. Increases in initial TOF have been observed at pressures up to 1500 psig, though it is possible that this effect can be extrapolated to even higher pressures.

This positive CO pressure effect is unprecedented for hydroformylation catalysts. All good hydroformylation catalysts studied have an inverse CO pressure effect on the rate. Although not wishing to be bound by any particular theory, these results suggest that the enhanced efficacy of the catalysts described herein is due to the combination of cationic charge, Co(II) oxidation state, and odd electron count a.

Figure 4:
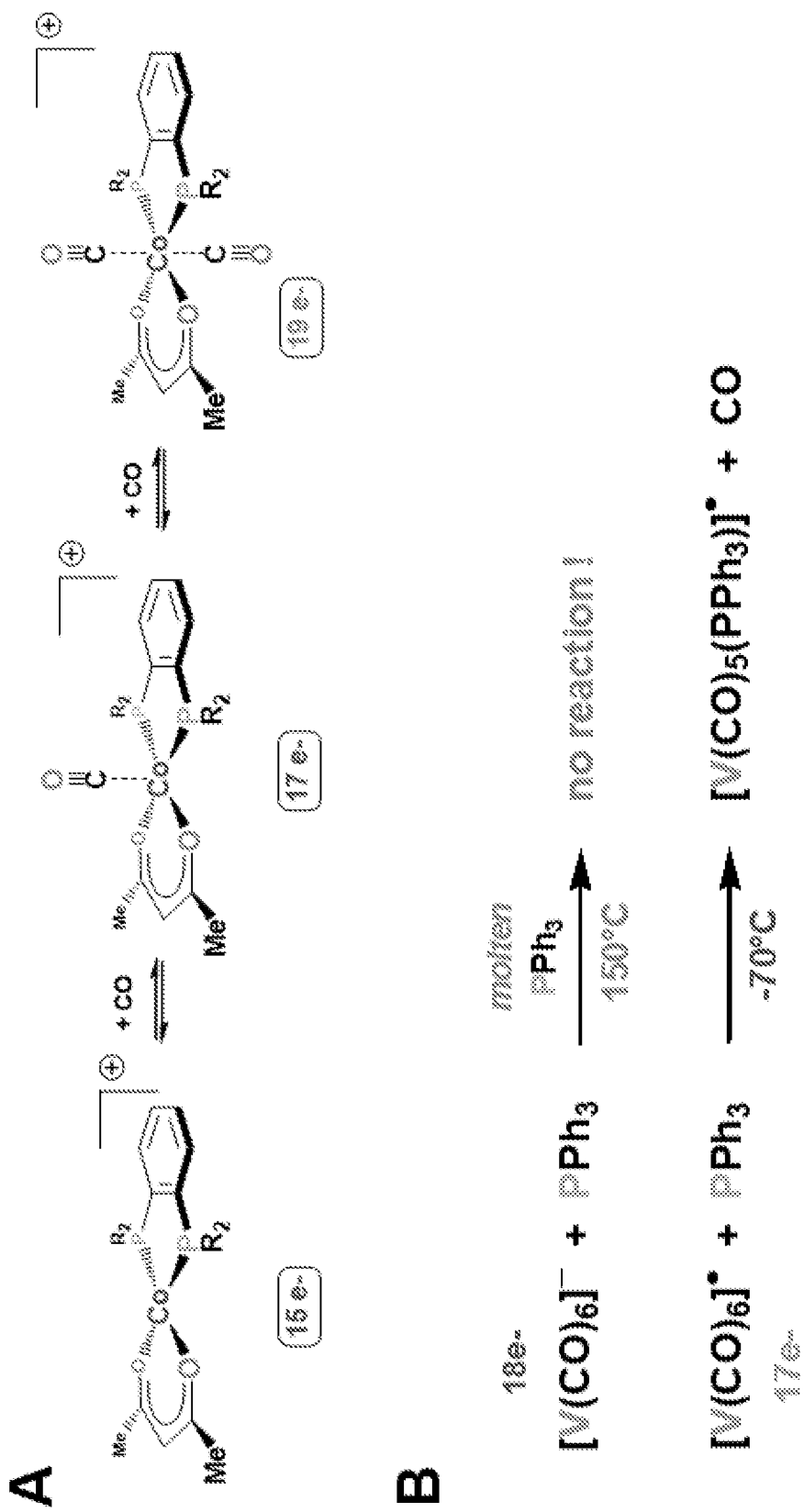
FIG. 4, comprising

In situ FT-IR studies indicate that the starting [Co(acac)(P$_2$)]$^+$ complex initially reacts with CO via the equilibrium shown in FIG. 4A. Two CO bands appear in the FT-IR spectrum at 1922 and 1940 cm$^{-1}$. The higher energy shoulder is assigned to the 19e− dicarbonyl complex, while the 1922 cm$^{-1}$ band is due to the 17e− complex with just one CO coordinated. H$_2$ begins to react once the temperature increases above 40° C., favoring faster CO dissociative processes, to kick off the protonated acac ligand and generating the 17e− hydrido-carbonyl complex [HCo(CO)$_2$(P$_2$)]$^+$. Subsequent studies carried out under pure CO show that 17e− [HCo(CO)2(bisphosphine)]+ has a carbonyl band around 1940 cm$^{-1}$, while the 19e− [HCo(CO)3(bisphosphine)]+ has a carbonyl band at 2090 cm$^{-1}$ (see Example 6 below and FIG. 8).

The ability to add ligands and access 19e− complexes is a key feature for the exceptional activity of the cationic Co(II) catalysts described herein. For example, the 18e− [V(CO)$_6$]$^−$ anion is extremely stable due to the strong π-backbonding to the CO ligands (FIG. 4B), so the associative substitution reaction has a high activation barrier to the formation of the high energy seven-coordinate 20e− intermediate [V(CO)$_6$(PPh$_3$)]$^−$ (Basolo, et al, J. Am. Chem. Soc., 1984, 106, 71-76). In marked contrast, the 17e− V(CO)$_6$ radical is extremely reactive to the associative substitution and readily proceeds through the seven-coordinate 19e− complex, V(CO)$_6$(PPh$_3$). The experimental data fully support an associative substitution with a rate law of: rate=k[V(CO)$_6$][PPh$_3$], showing second order kinetics. The entropy component of the activation barrier, $\Delta S^\ddagger = -28$ J/molK, is also consistent with an associative substitution via a 19e− species. Once the 19e− complex has formed, the half-occupancy of a metal-ligand antibonding orbital labilizes a carbonyl ligand. The much lower activation barrier and lower energy for the 19e− intermediate for ligand addition to a sterically unencumbered 17e− complex makes this a facile reaction.

Figure 5:
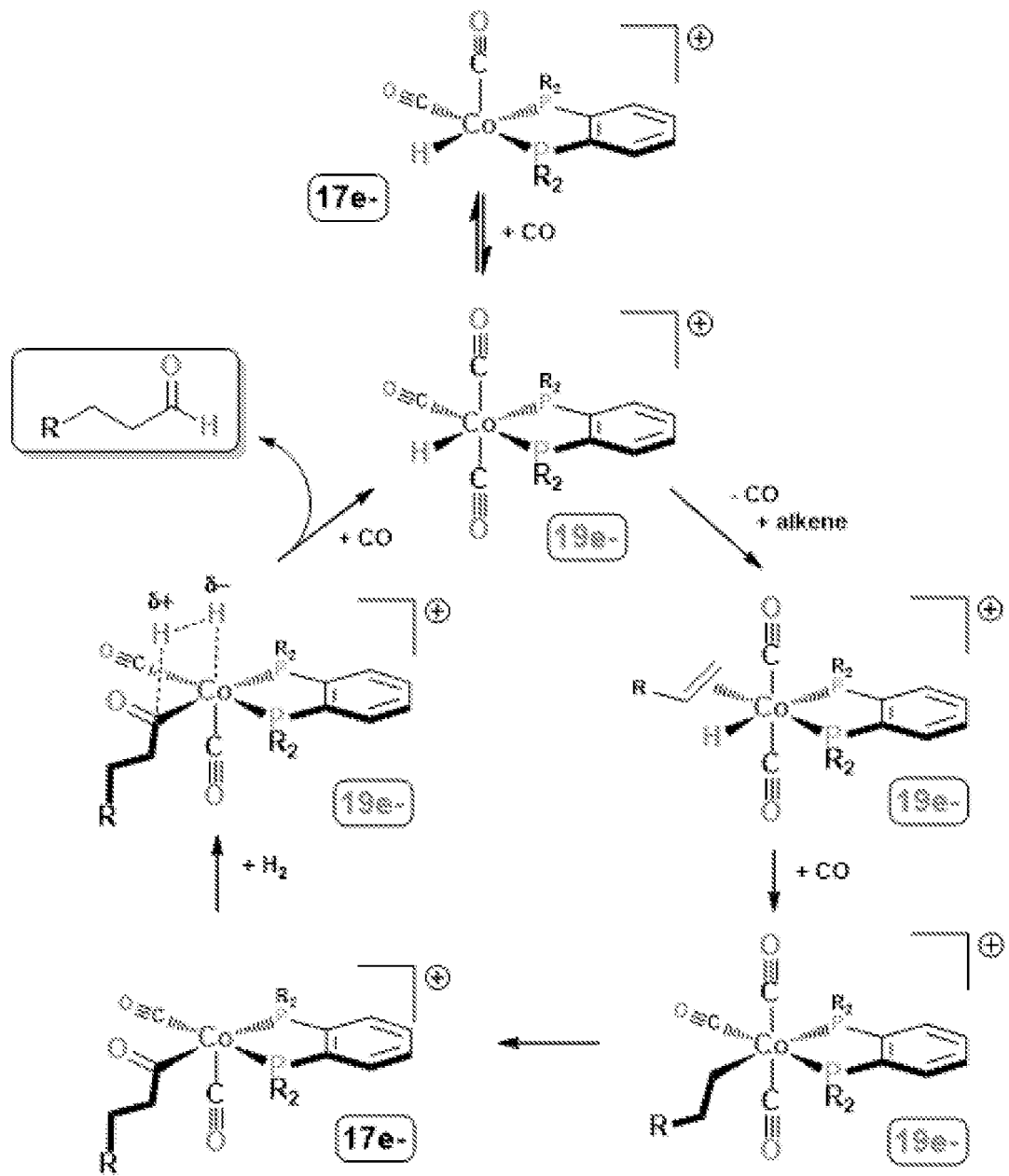
FIG. 5 is a scheme showing an updated proposed mechanism for cationic Co(II) hydroformylation with bisphosphine ligands that do not block the axial coordination sites. Only production of the linear aldehyde product is shown, although a similar mechanism to make the branched aldehyde may also be used.

This lower energy 17e− to 19e− ligand addition process appears to play a key role in the hydroformylation activity of the cationic Co(II) complexes described herein. FIG. 5 shows a mechanism for hydroformylation that proceeds through 5-coordinate 17e− and 6-coordinate 19e− complexes. The key step in the reaction is the labilization of the equatorial CO ligand, trans to the chelating phosphine, which is normally the stronger coordinated carbonyl ligand. DFT calculations and crystal structures of related chelated bisphosphine complexes clearly indicate that the axial coordination sites are not open enough to coordinate internal alkenes. This is especially true for internal alkenes with nearby branches, which exhibit high hydroformylation rates using catalysts of the present disclosure. Forming the six-coordinate 19e− complex, [HCo(CO)$_3$(P$_2$)]$^+$, helps labilize all the CO ligands, but the most important one is the more strongly coordinated equatorial Co—CO that needs to dissociate in order to coordinate the alkene and initiate catalysis.

The cationic charge also appears to be quite important to reduce the electron density on the cobalt and weaken the π-backbonding to the carbonyl ligands. The positive charge also increases the electrophilicity of the cobalt center for branched internal alkenes that are normally difficult to coordinate to most hydroformylation catalysts.

The ability to add a CO to the 5-coordinate 17e− [HCo(CO)$_2$(P$_2$)]$^+$ complex forming the 6-coordinate 19e− complex, [HCo(CO)$_3$(P$_2$)]$^+$, helps to dramatically labilize the equatorial CO and allow alkene coordination into the least sterically hindered coordination site on the cobalt. Although not wishing to be bound by any particular theory, the 19e− catalyst formation suggests almost all the extremely unusual features of this cationic Co(II) catalyst, including the positive effect of increasing CO pressure on this catalyst and that more electron-rich phosphines show increased activity at lower temperatures and pressures. All even-electron hydroformylation catalysts are slowed or deactivated by using more electron-rich phosphines. Making the cationic cobalt center more electron-rich, however, favors CO coordination to form the 19e− complex at lower temperatures and pressures. Once the 19e− complex is formed, equatorial CO lability is dramatically increased.

Chelating phosphine ligands that block the cobalt axial coordination sites deactivate the catalyst. Although not wishing to be bound by any particular theory, this appears to be a steric effect that affects the axial sites far more than the equatorial sites. Catalyst activity appears to be directly related to the need to form highly labile six-coordinate 19e– complexes. If the axial sites are blocked, one cannot access the 19e– complexes to labilize the equatorial CO ligand and allow alkene coordination.

For the chelating phosphines that work well, changing the ethyl R-groups to phenyl, and vice versa, has almost no effect on the aldehyde L:B regioselectivity. Although not wishing to be bound by any particular theory, this result suggests the importance of the less sterically hindered equatorial site for the alkene coordination to initiate catalysis, and not one of the axial sites. Since the phosphine R-groups tend to point up or down from the equatorial coordination plane, they do not have much steric directing effect on the equatorial alkene-hydride migratory insertion reaction to make linear or branched alkyls. Therefore, chelating phosphines that will increase the L:B regioselectivity by having more steric control on the equatorial plane may be useful.

Monodentate phosphines tested so far are not useful ligands for hydroformylation using this cationic Co(II) system. Chelating phosphines impose the idea coordination geometry and help stabilize the catalyst with respect to degradation reactions. The cationic charge, higher oxidation state of the cobalt center, and key ability to access highly labile 19e– complexes compensates for having two donating phosphine ligands that would kill a "regular" neutral, even-electron count cobalt catalyst.

One aspect of this cationic Co(II) catalyst that is not fully understood is the fact that the weaker chelating phosphines work well at 140° C. and relatively high pressures (still testing the limits). Extensive work on dicationic dirhodium oxo catalysts, $[Rh_2(\mu-H)_2(CO)_2(et,ph-P4)]^{2+}$, demonstrate facile phosphine chelate arm dissociation at 90° C. and 90 psig (6.2 bar) 1:1 $H_2$/CO (acetone solvent). This chelate arm dissociation leads to fragmentation of the $Rh_2$ catalyst into inactive monometallic and double-P4 ligand coordinated dimers.

First row metals usually have weaker metal-ligand bonds, so the apparent stability of $[HCo(CO)_x(P_2)]^+$ with simple ethylene-bridged chelates at higher temperatures and pressures is notable. Although not wishing to be bound by any particular theory, one explanation is that the electrophilic cobalt center has a much stronger coordination preference for donating ligands like phosphines, especially in the presence of π-backbonding carbonyls.

Both Shell and ExxonMobil start with Co(II) salts as precursors for generating the $HCo(CO)_4$ and $HCo(CO)_3(PR_3)$ catalysts, however they may not see this kind of highly active Co(II) cationic catalyst because of the catalyst precursor employed. Shell, for example, often uses a $Co(alkoxide)_2$ starting material and activates it under $H_2$/CO in the presence of phosphine. This chemistry eventually leads to the formation of $Co_2(CO)_6(PR_3)_2$, which then reacts with $H_2$ to form the neutral 18e– catalyst: $HCo(CO)_3(PR_3)$.

By starting with a cationic starting material, $[Co(acac)(P_2)](BF_4)$, with a chelating phosphine, good acac leaving group, and an "inert" $BF_4$ counter-anion, the catalysts herein may be useful to stabilize the Co(II) $d^7$ oxidation state and maintain the important cationic charge. A similar effect is seen with dirhodium tetraphosphine hydroformylation catalyst systems. A neutral precursor such as $Rh_2(\mu^3-allyl)_2$(rac-et,ph-P4) results in a terrible neutral dirhodium hydroformylation catalyst system with rhodium centers in the +1 and 0 oxidation states (Chem. Comm., 1998, 2607-2608). On the other hand, the dicationic precursor, $[Rh_2(nbd)_2$(rac-et,ph-P4)$](BF_4)_2$ (nbd=norbornadiene) results in a highly active and selective hydroformylation system (Angew. Chemie. Int. Ed., 1996, 35, 2253-2256) where the cationic Rh centers are in the unusual +2 oxidation state. Thus, the starting material and ligands used can be important.

Example 4: Cobalt Hydroformylation of 1-Alkenes

Figure 6:
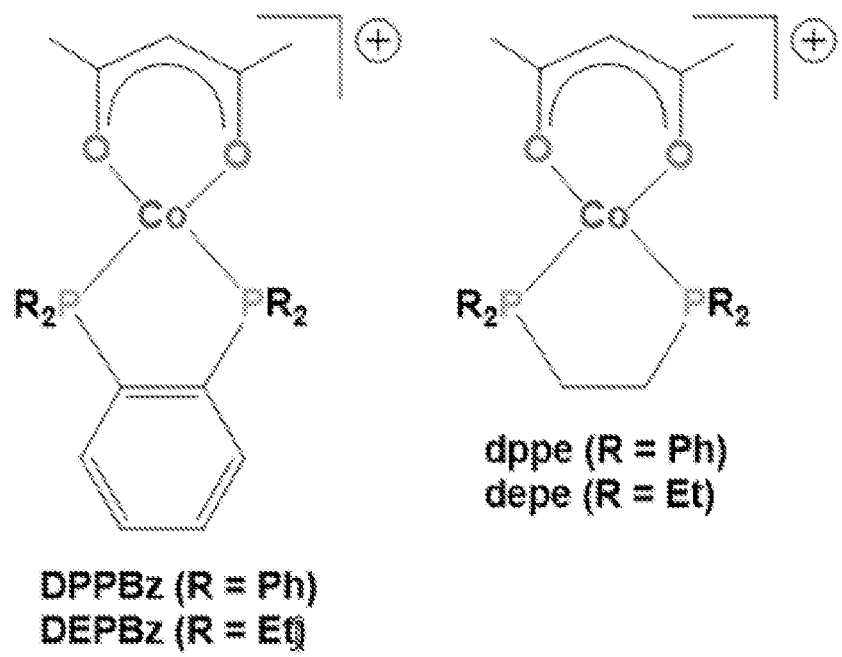
FIG. 6 shows chemical structures for representative disclosed catalyst precursors and ligands and associated ligand abbreviations.

The data in Example 1 were further elaborated upon by the studies in the present example. Briefly, an electron-rich DEPBz bisphosphine ligand-based Co(II) catalyst, [Co(acac)(DEPBz)]($BF_4$), was prepared as described above in Example 1 and utilized in hydroformylation of 1-hexene. The catalyst precursors and various ligands and the ligand abbreviations used are shown in FIG. 6. The data below, in Table 2, show further data pertaining to temperature and pressure dependency of hydroformylation of 1-hexene with the disclosed catalyst, [Co(acac)(DEPBz)]($BF_4$). In the table, DEPBz=$(Et_2P)_2$-1,2-$C_6H_4$. All reactions run for 2 hrs with 1.0 M 1-hexene, 1.0 mM catalyst, 0.1 M heptane as internal standard, 1:1 $H_2$/CO in dimethoxytetraglyme (t-glyme) solvent. TOF=initial turnover frequency based on a 5 min sample. Product analysis determined by GC/MS. Results are based on three or more consistent runs with standard deviations given in parentheses. No alcohol production was observed.

TABLE 2

Temperature and Pressure Dependent Studies for the Hydroformylation of 1-hexene with [Co(acac)(DEPBz)]($BF_4$).

| Temp (° C.) | Pressure (bar) | Initial TOF (min$^{-1}$) | Aldehyde (%) | Aldehyde L:B | Alkane (%) | Isomerization (%) |
|---|---|---|---|---|---|---|
| 120* | 50 | 25.4(5.0) | 74.6(5.4) | 1.6 | 0 | 7.9(1.1) |
| 140 | 50 | 61.5(6.1) | 84.7(1.2) | 1.3 | 0 | 10.0(1.2) |
| 160** | 50 | 76.8(2.0) | 78.2(4.9) | 1.1 | 1.3(0.3) | 19.5(1.0) |

| Pressure (bar) | Temp (° C.) | Initial TOF (min$^{-1}$) | Aldehyde (%) | Aldehyde L:B | Alkane (%) | Isomerization (%) |
|---|---|---|---|---|---|---|
| 30* | 140 | 40.0(5.1) | 73.7(1.5) | 1.0 | 0.5(0.4) | 21.8(1.7) |
| 50 | 140 | 61.5(6.1) | 84.7(1.2) | 1.3 | 0 | 10.0(1.2) |
| 70 | 140 | 36.7(3.5) | 79.3(2.2) | 1.6 | 0 | 10.7(0.9) |
| 90 | 140 | 21.7(2.3) | 82.5(2.6) | 1.8 | 0 | 8.1(0.6) |

*The reaction mixture was heated to 160° C. for 5 mins to activate catalyst then cooled to operating temperature before the alkene was injected.
**Some black cobalt metal deposition was observed inside the autoclave which is suggestive that some catalyst decomposition occurred.

The data in Example 1 are further elaborated upon by the studies in the present example. Briefly, an electron-rich DPPBz bisphosphine ligand-based Co(II) catalyst, [Co(acac)(DPPBz)](BF$_4$), was prepared as described above and utilized in hydroformylation of 1-hexene. The table below shows data obtained using the DPPBz bisphosphine ligand-based Co(II) catalyst. In the table below, DPPBz=(Ph$_2$P)$_2$-1,2-C$_6$H$_4$. The catalyst conditions used were as follows: 1 mM catalyst (61 ppm Co), 1 M 1-hexene, 0.1 M heptane standard, solvent=dimethoxytetraglyme (t-glyme), 1:1 H$_2$:CO, 1000 rpm stirring under constant pressure. TOF=initial turnover frequency based on a sample taken at 2 min. Other results based on sampling after 1 hour. The data below shows that the DPPBz bisphosphine ligand-based Co(II) catalyst shows a catalytic rate increase dependence on carbon monoxide pressure over a larger pressure range. It starts slowing around 100+ bar of 1:1H$_2$/CO pressure.

TABLE 3

Temperature and Pressure Dependent Studies for the Hydroformylation of 1-hexene with [Co(acac)(DPPBz)](BF$_4$).

| Temp (° C.) | Pressure (bar) | Initial TOF (min$^{-1}$) | Aldehyde (%) | Aldehyde L:B | Alkane (%) | Isomerization (%) |
|---|---|---|---|---|---|---|
| 120* | 50 | 26.5 | 59.4 | 1.7 | 0 | 7.6 |
| 140* | 50 | 43.6 | 71.3 | 1.3 | 0.3 | 17.9 |
| 160 | 50 | 66.0 | 76.8 | 1.1 | 1.4 | 18.9 |

| Pressure (bar) | Temp (° C.) | Initial TOF (min$^{-1}$) | Aldehyde (%) | Aldehyde L:B | Alkane (%) | Isomerization (%) |
|---|---|---|---|---|---|---|
| 30** | 160 | 52.5 | 49.0 | 0.94 | 1.4 | 45.7 |
| 50 | 160 | 66.0 | 76.8 | 1.1 | 1.4 | 18.9 |
| 70 | 160 | 94.8 | 84.0 | 1.3 | 1.2 | 12.1 |
| 90 | 160 | 103.2 | 87.3 | 1.4 | 1.0 | 9.1 |

*The reaction mixture was heated to 160° C. for 5 mins to activate the catalyst then cooled to operating temperature before alkene injection. The TOF indicates initial turnover frequency based on a 2 min sample.
**Some black cobalt metal deposition was observed inside the autoclave which is suggestive that some catalyst decomposition occurred.

The data in the foregoing data show that a disclosed more electron-rich DEPBz-based catalyst shows some slowing above 50 bar of H$_2$/CO pressure, whereas a disclosed [Co-DPPBz]+ catalyst shows a steady increase in the rate of hydroformylation as the H2/CO pressure is increased from 30 to 90 bar at 160° C. That is, the [Co-DPPBz]+ catalyst system does not show slowing until about 100 bar of H$_2$/CO pressure.

Example 5: Cobalt Hydroformylation of Internal Branched Alkenes

Figure 7:
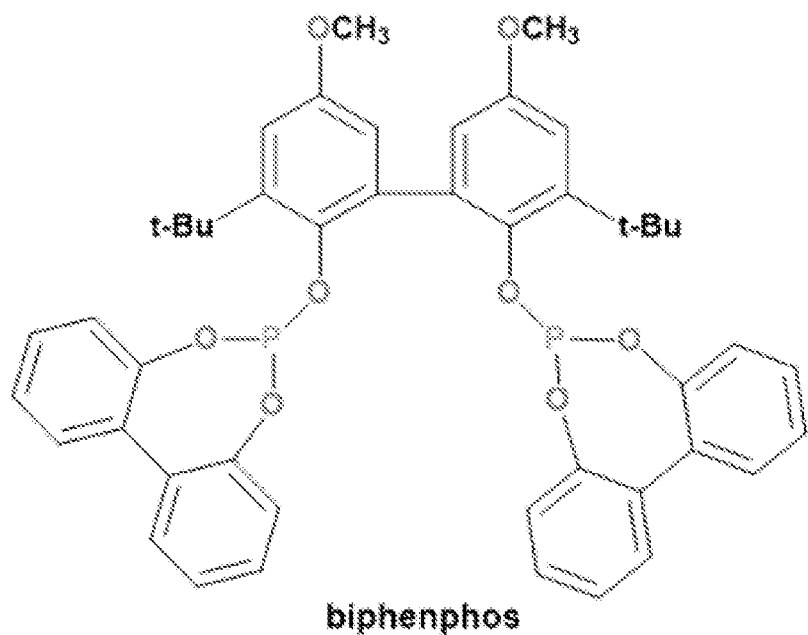
FIG. 7 shows chemical structures for representative disclosed biphenphos ligand.

The data in Example 2 were further elaborated upon by the studies in the present example that compare various disclosed bisphosphine Co(II) cationic catalyst precursors to conventional rhodium-based catalysts prepared as described herein above. The biphenphos ligand is as described herein and FIG. 7. Briefly, reactions were run with 1.0 M 3,3-dimethylbutene, 1.0 mM catalyst, 0.1 M heptane as internal standard, and 1:1 H$_2$/CO. The representative disclosed cobalt precursors used were [Co(acac)(bisphosphine)](BF$_4$). Results are based on three or more consistent runs with standard deviations given in parentheses. Reaction times for were as follows: (a) cobalt catalysts were run for 2 hours; and (b) the rhodium catalysts were run for 20 mins. The k(obs) was determined by gas consumption analysis under constant pressure conditions. Cobalt reactions were run in t-glyme solvent and activated at 160° C. for 5 mins then cooled to operating temperature before the alkene was injected. Rh(acac)(CO)$_2$ was used as the catalyst precursor and run in toluene with the following excess phosphine:Rh ratios: 3:1 for the chelating biphenphos ligand, and 400:1 for PPh$_3$:Rh. No excess phosphine was used for the cobalt runs. Data obtained for hydroformylation of 3,3-dimethylbutene by the disclosed representative cobalt catalysts and conventional rhodium catalysts are provided in Table 4 below.

TABLE 4

Hydroformylation of 3,3-Dimethylbutene by Cobalt and Rhodium Catalysts.

| Catalyst | Temp (° C.) | Press (bar) | Time (min) | Aldehyde (%) | Aldehyde L:B | Alkane (%) | k(obs) × 10$^{-4}$ (M sec$^{-1}$) |
|---|---|---|---|---|---|---|---|
| [Co:DPPBz]$^+$ | 140 | 30 | 120 | 60.0(3.8) | 58 | 0.8(0.02) | 1.4(2) |
| [Co:dppe}$^+$ | 140 | 30 | 120 | 64.1(3.5) | 57 | 1.0(0.1) | 1.5(1) |
| [Co:depe]$^+$ | 140 | 30 | 120 | 77.1(1.0) | 54 | 1.2(0.05) | 2.1(1) |
| [Co:DEPBz]$^+$ | 140 | 30 | 120 | 84.8(1.7) | 51 | 1.2(0.1) | 2.6(1) |
| Rh:biphenphos | 120 | 15 | 20 | 96.4(0.2) | All linear | 3.3(0.06) | 25(1) |
| Rh:PPh$_3$ | 120 | 10.3 | 20 | 91.1(2.1) | 34 | 0.3(0.04) | 21(2) |

Further studies were carried out using the $HCo(CO)_4$ catalyst, the high-pressure, unmodified Co(I) catalyst system, the cationic Co(II)-depe catalyst, and two conventional rhodium phosphine catalysts in the hydroformylation reaction using sterically hindered, internal branched alkenes. The catalysts were prepared as described herein above. Briefly, all reactions were run for 6 hrs with the indicated alkene (1.0 M) with 1.0 mM catalyst and 1:1 $H_2/CO$, using 0.1 M heptane as an internal standard. Results shown below in Table 5 are based on an average of two to four runs. $Co_2(CO)_8$ or $Co(hexanoate)_2$ was used to generate $HCo(CO)_4$ and all the cobalt reactions were run in t-glyme solvent. [Co(acac)(depe)]($BF_4$) was used as the cationic Co(II) precursor, depe=$Et_2PCH_2CH_2PEt_2$. $Rh(acac)(CO)_2$ was used as the catalyst precursor and run in toluene with the following excess phosphine: Rh ratios: 3:1 for the chelating biphenphos ligand, and 400:1 for $PPh_3$:Rh. No alcohol production was observed. The data are provided in Table 5 below.

TABLE 5

Hydroformylation Results for Internal Branched Alkenes using Different Catalysts.

| Alkene | Catalyst | Temp (° C.) | Press (bar) | Aldehyde (%) | Aldehyde L:B | Alkane (%) | Isomer (%) |
|---|---|---|---|---|---|---|---|
| | $HCo(CO)_4$ | 140 | 90 | 36.5 | All linear | 0 | 4.8 |
| | [Co:depe]+ | 140 | 30 | 24.9 | All linear | 0 | 10.0 |
| | Rh:biphenphos | 120 | 15 | 0 | — | 0 | 0 |
| | Rh:$PPh_3$ | 120 | 10.3 | 0 | — | 0 | 0 |
| | $HCo(CO)_4$ | 140 | 90 | 28.6 | All linear | 2.2 | 14.2 |
| | [Co:depe]+ | 140 | 30 | 26.9 | All linear | 3.7 | 33.5 |
| | Rh:biphenphos | 120 | 15 | 0.8 | All linear | 0 | 2.8 |
| | Rh:$PPh_3$ | 120 | 10.3 | 0 | — | 0 | 0 |
| | $HCo(CO)_4$ | 140 | 90 | 77.7 | 6.2 | 0 | 10.4 |
| | [Co:depe]+ | 140 | 30 | 54.7 | 4.4 | 0 | 32.1 |
| | Rh:biphenphos* | 120 | 15 | 81.7* | 28 | 1.9 | 14.8 |
| | Rh:$PPh_3$ | 120 | 10.3 | 62.0 | 0.4 | 0 | 8.4 |

*The Rh:biphenphos catalyst decomposed after about 3 hours, with cessation of hydroformylation.

Figure 8:
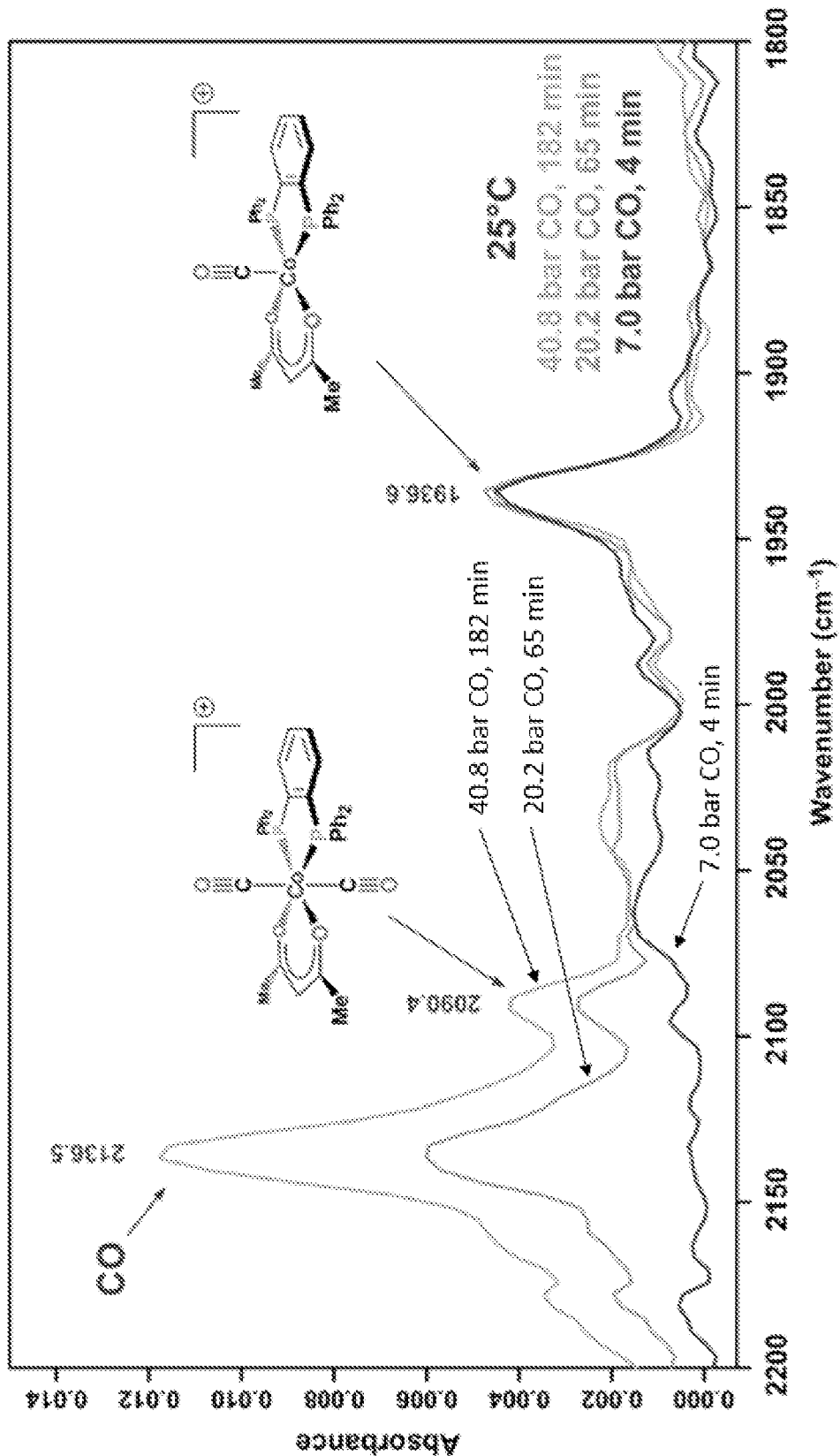
FIG. 8 shows representative data for a high pressure infrared (IR) spectroscopic study of the $[Co(acac)(DPPBz)](BF_4)$ catalyst precursor under various pressures of pure carbon monoxide as indicated. The IR peaks for CO and the catalyst precursors are as indicated in the figure.

Example 6: Infrared Spectroscopic Study of [Co(Acac)(DPPBz)]($BF_4$) Catalyst Precursor A high pressure infrared (IR) spectroscopic study was carried out of the [Co(acac)(DPPBz)]($BF_4$) catalyst precursor under various pressures of pure carbon monoxide. The data show that the 17e– [Co(acac)(CO)(DPPBz)]+ species has a carbonyl stretching frequency at 1937 $cm^{-1}$, whereas the 19e– [Co(acac)(CO)$_2$(DPPBz)]+ complex has a higher CO stretching frequency at 2090 $cm^{-1}$. The data are shown in FIG. 8.

Example 7: Catalytic Turnover Studies Using [Co(acac)(bisphospine)]($BF_4$) with 1-Hexene Briefly, all catalytic runs were done in dimethoxytetraglyme (t-glyme) solvent at 160° C. using 1:1 $H_2$:CO. Parameters for the 1.2 Million TON run: 3 µM catalyst (0.000186 g, 0.24 ppm Co) in 6 M 1-hexene (45.45 g, 68 mL) with 18 mL of t-glyme and heptane as internal standard. The reaction was run at 160° C. under 50 bar (725 psig) of syn gas for 14 days (336 hrs). The room temperature catalyst was pressure injected into the hot alkene to initiate the reaction. Using the heptane internal standard, adjustment for the heavy ends of product distribution is as follows: 2% 1-hexene, 1.2% alkane, 40.8% iso-hexenes, 33.4% aldehyde (over half 2-methyl hexanal), 1.1% alcohol, 21.5% heavy ends (mostly aldehyde dimers and trimers). Data are provided in Table 6 below. In the table, the catalyst is used was [Co(acac){($R_2P)_2$-1,2-$C_6H_4$}]($BF_4$), with the R group as indicated in the table, and other conditions as indicated therein. Briefly, the data show that the cationic Co(II) catalyst performed within acceptable parameters through to the time when each reaction was stopped. The data show that as 1-hexene concentration decreases, the catalyst operates more slowly with first order kinetics in 1-hexene over the concentration ranges studied.

TABLE 6

High Turnover Extended Catalysis Runs for 1-Hexene Hydroformylation using [Co(acac){($R_2P)_2$-1,2-$C_6H_4$}]($BF_4$) at 160° C.

| Catalyst | Time (hr) | Avg TOF ($min^{-1}$) | Aldehyde (TON) | L:B | Isomer (%) | Alkane (%) |
|---|---|---|---|---|---|---|
| R = Et (55.2 bar) [Co] = 0.01 mM [Co] = 0.61 ppm [1-hexene] = 1M | 3 | 58.6 | 10,600 | | 19.3 | 0.3 |
| | 20 | 48.6 | 58,200 | 1.2 | 34.4 | 1.0 |

TABLE 6-continued

High Turnover Extended Catalysis Runs for 1-Hexene Hydroformylation using [Co(acac){(R$_2$P)$_2$-1,2-C$_6$H$_4$)}](BF$_4$) at 160° C.

| Catalyst | Time (hr) | Avg TOF (min$^{-1}$) | Aldehyde (TON) | L:B | Isomer (%) | Alkane (%) |
|---|---|---|---|---|---|---|
| R = Ph (50 bar) [Co] = 6 μM [Co] = 0.48 ppm [1-hexene] = 6M | 24 | 64.8 | 93,000 | | 24.2 | 0.4 |
| | 41 | 74.6 | 179,000 | 0.9 | 34.2 | 0.5 |
| R = Ph (50 bar) [Co] = 3 μM [Co] = 0.24 ppm [1-hexene] = 6M | 336 (2 weeks) | 59.5 | 1,200,000 (includes 21.5% heavy ends) | 0.9 | 40.8 | 1.2 |

The disclosures of each and every patent, patent application, and publication cited herein are hereby incorporated herein by reference in their entirety. While this disclosure has been disclosed with reference to specific aspects, it is apparent that other aspects and variations of this disclosure may be devised by others skilled in the art without departing from the true spirit and scope of the disclosure. The appended claims are intended to be construed to include all such aspects and equivalent variations.

What is claimed is:

1. A compound of formula (A), formula (B), or formula (C):

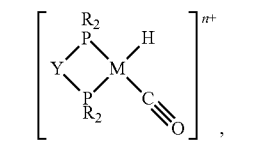
(A)

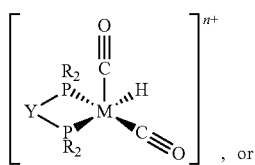
(B)
, or

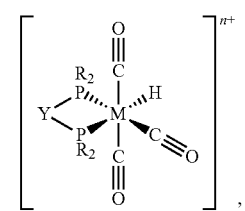
(C)
, wherein n is 1 or 2, wherein M is Co,
wherein Y is 1,2-C$_6$H$_4$; and wherein each occurrence of R is independently selected from the group consisting of ethyl or phenyl.

2. The compound of claim 1, wherein the compound is formula (A):

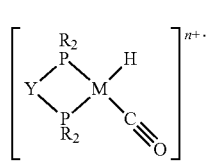
(A)

3. The compound of claim 1, wherein the compound is formula (B):

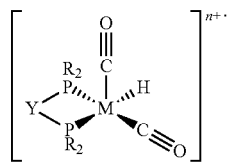
(B)

4. The compound of claim 1, wherein the compound is f formula (C):

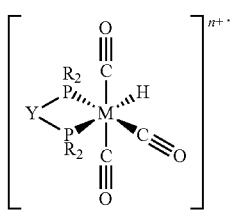
(C)

* * * * *